US012237604B2

(12) United States Patent
Lu et al.

(10) Patent No.: US 12,237,604 B2
(45) Date of Patent: Feb. 25, 2025

(54) ELECTRICAL CONNECTOR

(71) Applicant: Molex, LLC, Lisle, IL (US)

(72) Inventors: Chiuming Lu, Lisle, IL (US); Robert Piszczor, LaGrange, IL (US)

(73) Assignee: Molex, LLC, Lisle, IL (US)

( * ) Notice: Subject to any disclaimer, the term of this patent is extended or adjusted under 35 U.S.C. 154(b) by 221 days.

(21) Appl. No.: 17/778,858

(22) PCT Filed: Dec. 18, 2020

(86) PCT No.: PCT/US2020/066005
§ 371 (c)(1),
(2) Date: May 23, 2022

(87) PCT Pub. No.: WO2021/127431
PCT Pub. Date: Jun. 24, 2021

(65) Prior Publication Data

US 2023/0025463 A1 Jan. 26, 2023

Related U.S. Application Data

(60) Provisional application No. 62/950,939, filed on Dec. 20, 2019.

(51) Int. Cl.
*H01R 13/11* (2006.01)
*H01R 4/48* (2006.01)
(Continued)

(52) U.S. Cl.
CPC ............ *H01R 13/113* (2013.01); *H01R 4/48* (2013.01); *H01R 13/4223* (2013.01); *H01R 13/516* (2013.01); *H01R 25/142* (2013.01)

(58) Field of Classification Search
CPC .... H01R 13/113; H01R 4/48; H01R 13/4223; H01R 13/516; H01R 25/142;
(Continued)

(56) References Cited

U.S. PATENT DOCUMENTS 4,039,238 A 8/1977 Johnson, Jr
8,388,389 B2 * 3/2013 Costello ................ H01R 13/26 439/637

(Continued)

FOREIGN PATENT DOCUMENTS

CN 104377470 A 2/2015
CN 107690736 A 2/2018

(Continued)

OTHER PUBLICATIONS

International Search Report and Written Opinion received for PCT Application No. PCT/US2020/066005, mailed on Apr. 9, 2021, 10 Pages.

*Primary Examiner* — Alexander Gilman

(57) ABSTRACT

An electrical connector includes an insulative housing, and a pair of contacts which are secured together by a clamp mounted within the housing. Each electrical contact includes a planar body, spring fingers extending from a first end of the body, and a coupling extending from the body to couple the electrical contacts to the housing. A first deflection zone between the clamp and first ends of the spring fingers allows the spring fingers to deflect in a lateral direction to receive the conductive component within the receiving space. A second deflection zone between the first ends of the spring fingers and the second ends of the bodies allow the bodies and spring fingers to deflect in the lateral direction when the conductive component is received within the receiving space, but the conductive component is not directly aligned with the receiving space.

17 Claims, 26 Drawing Sheets

(51) Int. Cl.
*H01R 13/422* (2006.01)
*H01R 13/516* (2006.01)
*H01R 25/14* (2006.01)

(58) Field of Classification Search
CPC ............ H01R 12/7047; H01R 12/7088; H01R 12/716; H01R 12/91; H01R 4/34
USPC .......................................................... 439/852
See application file for complete search history.

(56) References Cited

U.S. PATENT DOCUMENTS

| | | | | |
|---|---|---|---|---|
| 8,939,787 | B2 * | 1/2015 | Kolbe | H01R 13/648 439/387 |
| 9,070,990 | B2 * | 6/2015 | Flickinger | H01R 4/10 |
| 9,680,236 | B2 * | 6/2017 | Ngo | H01R 4/48 |
| 11,502,441 | B1 * | 11/2022 | Tang | H01R 13/113 |
| 2006/0003620 | A1 | 1/2006 | Daily et al. | |
| 2007/0197063 | A1 * | 8/2007 | Ngo | H01R 12/727 439/108 |
| 2009/0047814 | A1 | 2/2009 | Daamen | |
| 2013/0012072 | A1 * | 1/2013 | Costello | H01R 13/18 439/786 |
| 2013/0316568 | A1 | 11/2013 | Yu | |
| 2014/0349529 | A1 * | 11/2014 | Flickinger | H01R 13/113 439/834 |
| 2015/0038024 | A1 | 2/2015 | Glick et al. | |
| 2019/0148845 | A1 * | 5/2019 | Reichert | H01R 43/027 29/881 |
| 2023/0025463 | A1 * | 1/2023 | Lu | H01R 13/516 |

FOREIGN PATENT DOCUMENTS

| | | | |
|---|---|---|---|
| EP | 2806499 | A1 | 11/2014 |
| JP | 2000340282 | A | 12/2000 |
| TW | 201814984 | A | 4/2018 |
| TW | M584993 | U | 10/2019 |

* cited by examiner

ELECTRICAL CONNECTOR

RELATED APPLICATIONS

This application is a national phase of PCT/US2020/066005, filed on Dec. 18, 2020, which claims priority to U.S. Provisional Application No. 62/950,939, filed Dec. 20, 2019, which is are incorporated herein by reference in their entireties.

FIELD OF THE INVENTION

The present invention is directed to a busbar connection system and an electrical system comprising such a busbar connection system.

DESCRIPTION OF RELATED ART

Busbar connection systems are commonly used in particular in electrical power distribution systems in order to distribute electrical power from a power source to a number of electrical devices. Such an electrical power distribution system usually includes at least two electrical contacts which are spaced apart from each other at a predetermined distance for connection to a number of electrical devices. Each electrical device includes at least two pluggable connectors in order to respectively connect to one of the electrical contacts. The pluggable connectors of every electrical device are spaced apart from each other in the predetermined distance of the two electrical contacts of the electrical power system. In applications that require more power, several electrical contacts are ganged together allowing for more power transmission.

Due to manufacturing tolerances, the distance between the electrical contacts can have a variation that exceeds typical variations in known standard bus bar systems. The electrical connectors therefore have to be produced and installed with high accuracy, which results in high manufacturing costs. Certain individuals can appreciate an improved structure that allows for greater manufacturing tolerances and therefore reduced costs.

BRIEF SUMMARY

Accordingly, the present disclosure provides an improved busbar assembly which can be used with a less accurately manufactured pair of electrical contacts while providing reliable electrical connections.

An electrical connector includes an insulative housing, and a pair of contacts which are secured together by a clamp mounted within the housing. Each electrical contact includes a planar body, spring fingers extending from a first end of the body, and a coupling extending from the body to couple the electrical contacts to the housing. A first deflection zone between the clamp and first ends of the spring fingers allows the spring fingers to deflect in a lateral direction to receive the conductive component within the receiving space. A second deflection zone between the first ends of the spring fingers and the second ends of the bodies allow the bodies and spring fingers to deflect in the lateral direction when the conductive component is received within the receiving space, but the conductive component is not directly aligned with the receiving space.

BRIEF DESCRIPTION OF THE DRAWINGS

The present disclosure is illustrated by way of example, and not limited, in the accompanying figures in which like reference numerals indicate similar elements and in which.

DETAILED DESCRIPTION

Figure 1:
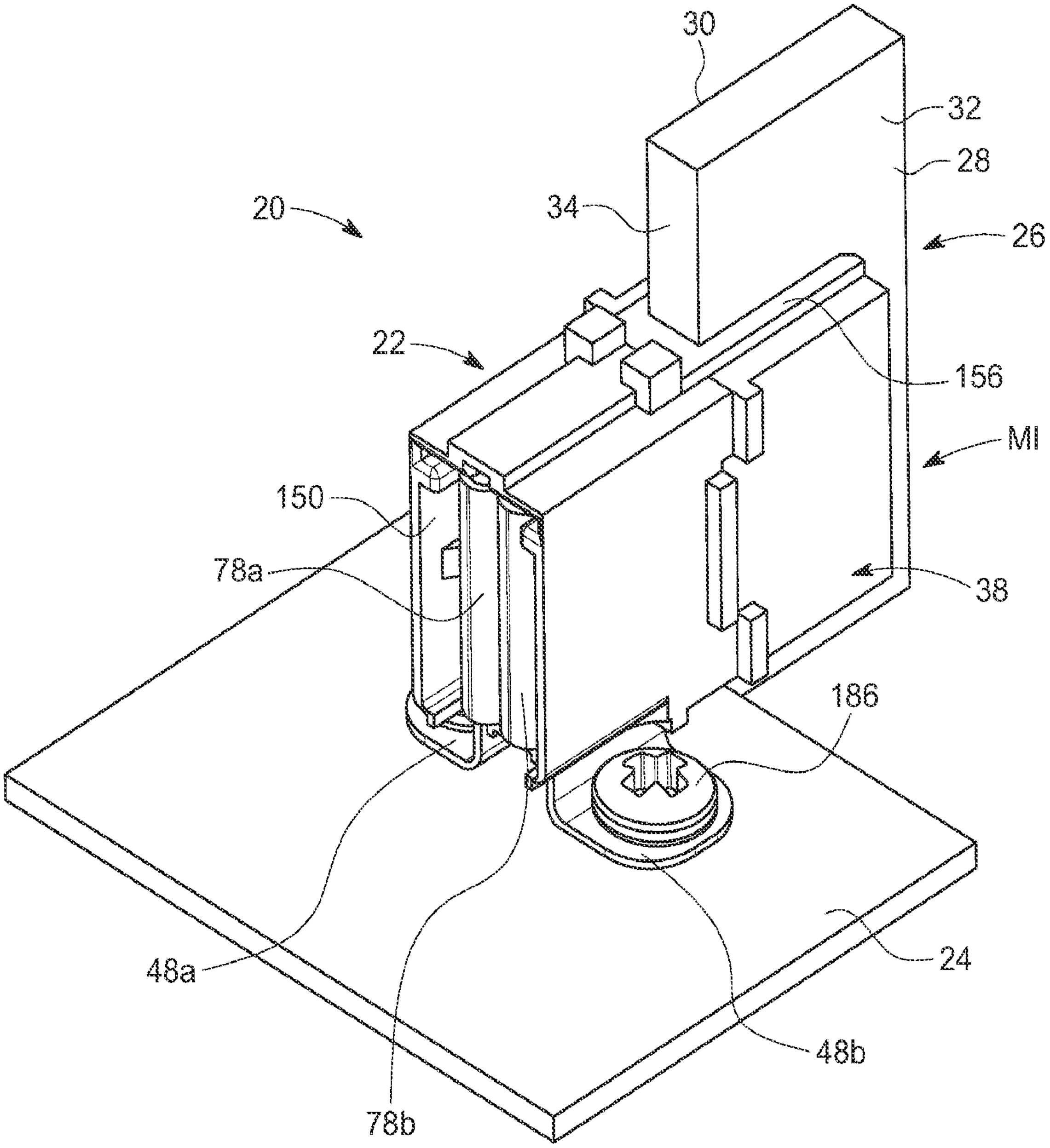
FIG. 1 depicts a perspective view of an electrical system which includes an embodiment of an electrical connector, an electrical element, and a conductive component.
Figure 2:
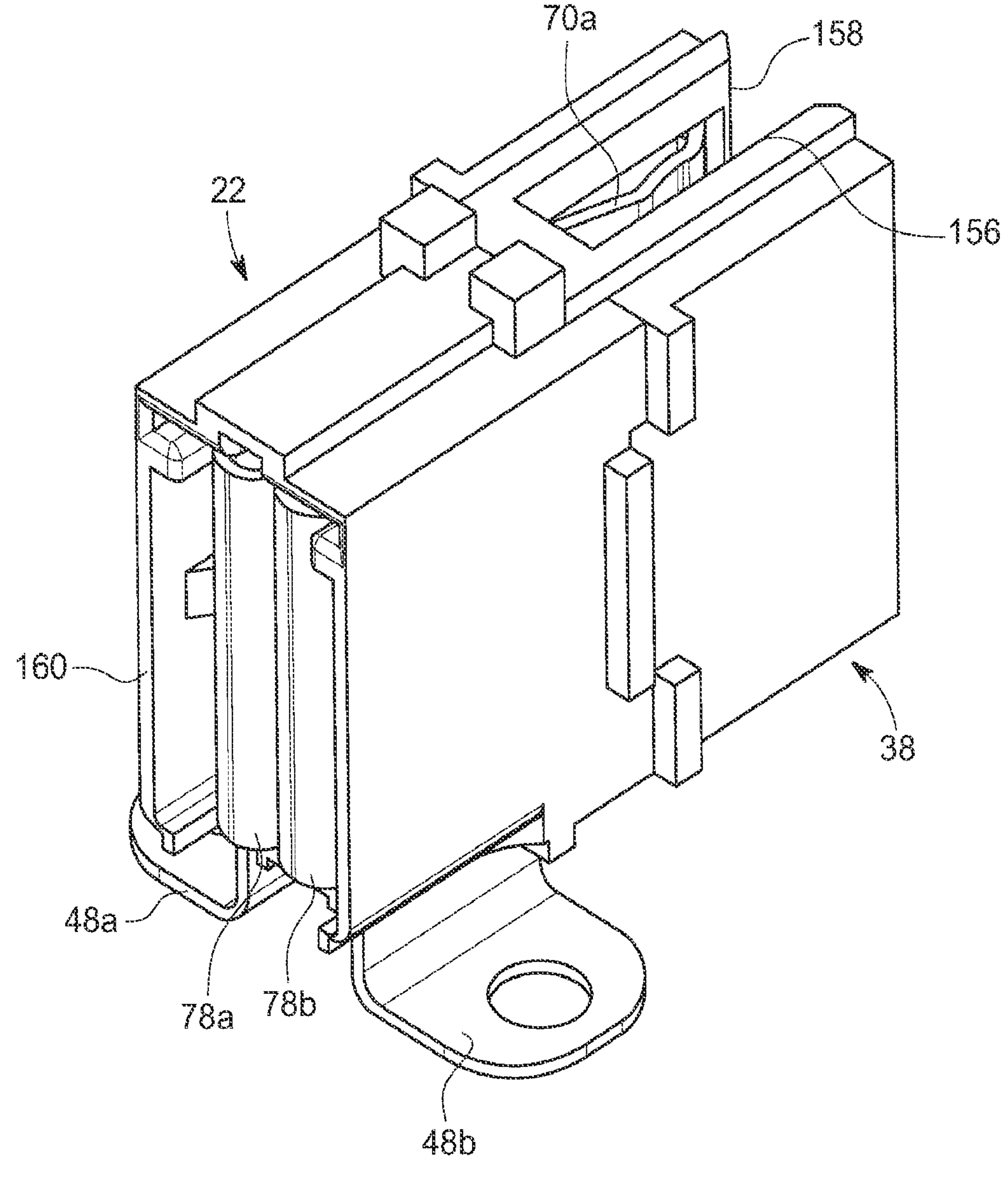
FIG. 2 depicts a perspective view of the electrical connector shown in FIG. 1.

The appended drawings illustrate embodiments of the present disclosure and it is to be understood that the disclosed embodiments are merely exemplary of the disclosure, which may be embodied in various forms. Therefore, specific details disclosed herein are not to be interpreted as limiting, but merely as a basis for the claims and as a representative basis for teaching one skilled in the art to variously employ the present disclosure.

An electrical system 20 includes an electrical connector 22, 222, 422, an electrical element 24, such as a circuit board, on which the electrical connector 22, 222, 422 is configured to be mounted, and a conductive component 26 configured to communicatively engage the electrical connector 22, 222, 422. In an embodiment, the conductive component 26 is a busbar and the electrical connector 22, 222, 422 is configured to transmit electrical power therethrough. In an embodiment, the conductive component 26 is another electrical connector, such as electrical connector 422. Other embodiments are contemplated in which the conductive component 26 is a circuit board or a cooperating connector of an electronic device. Instead of power that is transmitted through the electrical connector 22, 222, 422, signals can be transmitted.

In an embodiment, the conductive component 26 has an elongated and substantially rectangular-shaped body 28 that is configured to be gripped on both sides 30, 32 by the electrical connector 22 and which defines a mating edge 34. For example, the sides 30, 32 have surfaces that coincide with respective planes that extend along the longitudinal and elevation axes and are parallel to each other.

The electrical connector 22, 222, 422 includes first and second electrical contacts 36*a*, 36*b*, 236*a*, 236*b*, 436*a*, 436*b*, an insulative housing 38, 238, 438 in which the electrical contacts 36*a*, 36*b*, 236*a*, 236*b*, 436*a*, 436*b* are mounted, and a clamp 40 which connects the electrical contacts 36*a*, 36*b*, 236*a*, 236*b*, 436*a*, 436*b* together. In an embodiment, the electrical contacts 36*a*, 36*b*, 236*a*, 236*b*, 436*a*, 436*b* are configured to transmit electrical power therethrough. In another embodiment, the electrical contacts 36*a*, 36*b*, 236*a*, 236*b*, 436*a*, 436*b* are configured to transmit electrical signals therethrough. The embodiments shown in FIGS. 1-16 depict a right-angle connector, and the embodiments shown in FIGS. 19-32 depict a vertical connector.

Attention is invited to the embodiment of the electrical connector 22 shown in FIGS. 1-16. As shown in this embodiment, the electrical connector 22 and the electrical element 24 are oriented with respect to mutually perpendicular axes that include a longitudinal axis, an elevation (or vertical) axis, and a lateral (or horizontal) axis. This arrangement is typically called a "right-angle" system, but other embodiments may be arranged in another intermediate angle.

Figure 3:
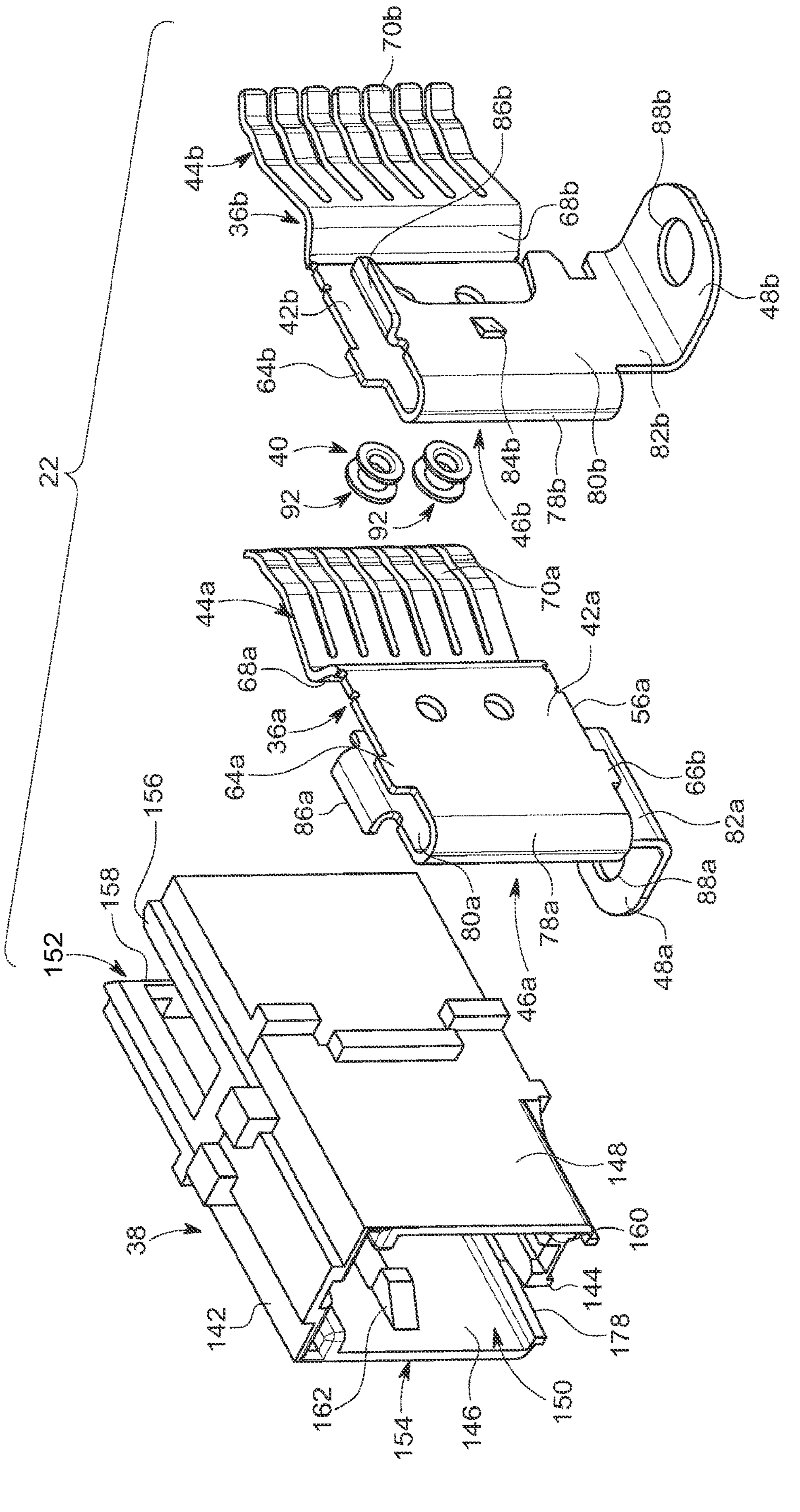
FIG. 3 depicts an exploded perspective view of the electrical connector shown in FIG. 2.
Figure 5:
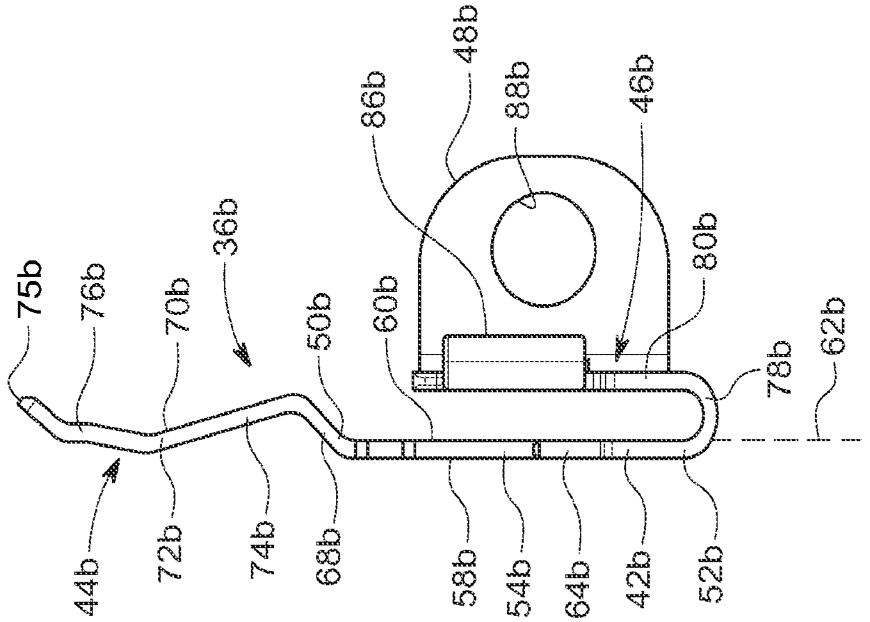
FIGS. 4 and 5 depict top plan views of electrical contacts of the electrical connector shown in FIG. 2.
Figure 4:
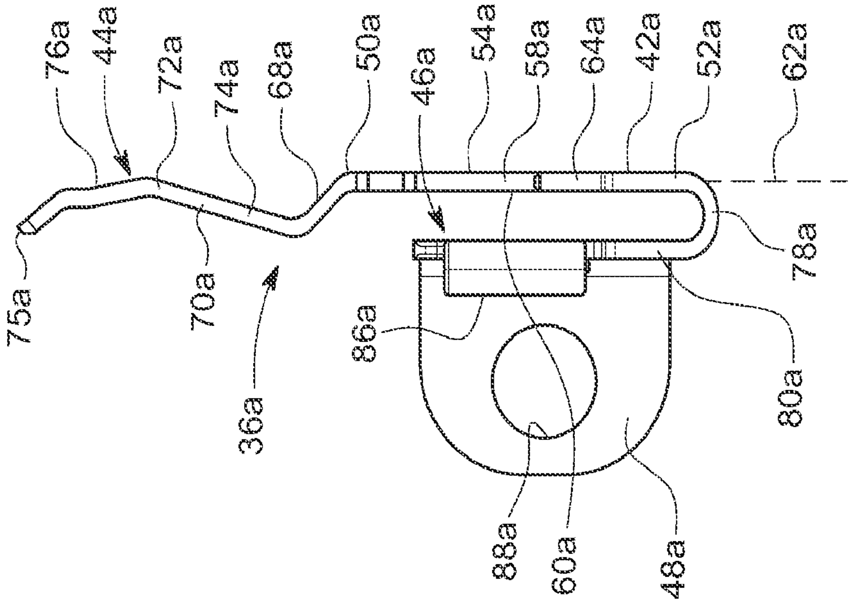

As shown in FIGS. 3-5, each electrical contact 36*a*, 36*b* has a connecting portion formed of a substantially rectangular-shaped planar body 42*a*, 42*b* and spring fingers 44*a*, 44*b* extending from the planar body 42*a*, 42*b*, and further has a mounting portion 46*a*, 46*b* extending from the planar body 42*a*, 42*b*, and a mounting flange 48*a*, 48*b* extending from the mounting portion 46*a*, 46*b*. The mounting portion 46*a*, 46*b* is fixed to the housing 38. The mounting flanges 48*a*, 48*b* are fixed to the electrical element 24. The planar bodies 42*a*, 42*b* and the spring fingers 44*a*, 44*b*, when clamped together by the clamp 40 as described herein, form a free standing beam within the housing 38. For purposes of clarity, the components of electrical contact 36*a* are described herein, and the like components of electrical contact 36*b* are denoted with the same reference numerals except with a "b" thereafter instead of an "a".

The planar body 42*a* has a front end 50*a*, an opposite rear end 52*a*, and top and bottom edges 54*a*, 56*a* extending between the front and rear ends 50*a*, 52*a* which define a first side surface 58*a* and a second side surface 60*a*. A longitudinal axis 62*a* is defined by the planar body 42*a* from the front end 50*a* to the rear end 52*a*. The side surfaces 58*a*, 60*a* coincide with respective planes that extend along the longitudinal and elevation axes and are parallel to each other. An upper tab 64*a* extends upward from the top edge 54*a*, and a lower tab 66*a* extends downward from the bottom edge 56*a*. Each tab 64*a*, 66*a* is coplanar with the planar body 42*a* and is proximate to, but spaced from, the rear end 52*a* of the planar body 42*a*.

The spring fingers 44*a* extend from the front end 50*a* of the planar body 42*a*. As shown, the spring fingers 44*a* include a rear wall 68*a* extending from the front end 50*a* of the planar body 42*a* and at an angle relative to the longitudinal axis 62*a*, and a column of spaced apart contact beams 70*a* extending from a front end of the rear wall 68*a*. Each contact beam 70*a* generally forms a shallow U-shape having a curved or V-shape base 72*a* and angled portions 74*a*, 76*a* extending from the base 72*a*. Angled portion 74*a* extends between the base 72*a* and the rear wall 68*a*. Angled portion 76*a* forms a front end 75*a* of the electrical contact 36*a*.

The mounting portion 46*a* has a first section 78*a* which extends perpendicularly from the rear end 52*a* of the planar body 42*a* and a second section 80*a* which extends perpendicularly from the first section 78*a* and overlaps the side surface 60*a* of the planar body 42*a*. The second section 80*a* is planar and extends parallel to the longitudinal axis 62*a* and parallel to the planar body 42*a*. The first section 78*a* may be U-shaped. The second section 80*a* has a section 82*a* that extends downward from the first section 78*a* and extends parallel to the longitudinal axis 62*a*. The second section 80*a* has engagements which engage with the housing 38 to prevent the movement of the mounting portion 46*a* relative to the housing 38. A first engagement may be provided by a projection 84*a* that extends outward from an outer side surface of the second section 80*a*. The projection 84*a* may be formed as a barb, as shown, having an angled forward face which is angled relative to the plane defined by the second section 80*a*, and a rear face which is perpendicular to the second section 80*a*. A second engagement may be provided by a flange 86*a* that extends upward from a top end of the second section 80*a*. As shown, the flange 86*a* has a first flange section which extends upward from the second section 80*a* and a second flange section which extends outward from the first flange section and is perpendicular thereto.

The mounting flange 48*a* extends from the section 82*a* of the mounting portion 46*a* and is perpendicular to the second section 80*a* and to the planar body 42*a*. An opening 88*a* is provided through the mounting flange 48*a*.

The electrical contacts 36*a*, 36*b* are clamped together by the clamp 40 to form a clamped pair prior to insertion into the housing 38. In the clamped pair, the side surfaces 58*a*, 58*b* of the electrical contacts 36*a*, 36*b* face each other such that the planar bodies 42*a*, 42*b* are parallel to each other, the rear walls 68*a*, 68*b* of the spring fingers 44*a*, 44*b* angle outward from each other, the first sections 78*a*, 78*b* extend outward from each other, and the mounting flanges 48*a*, 48*b* extend outward from each other. The planar bodies 42*a*, 42*b* are coupled together by the clamp 40 to prevent relative movement between the planar bodies 42*a*, 42*b*. The planar bodies 42*a*, 42*b* are cantilevered from the first sections 78*a*, 78*b*, and the planar bodies 42*a*, 42*b* define a bending beam. As illustrated, the clamp 40 is located about midway along the length of the beam formed by the planar bodies 42*a*, 42*b* and the spring fingers 44*a*, 44*b*. The clamp 40 effectively alters the bending or flexing of the electrical contacts 36*a*, 36*b* when mated. The bending arm is essentially shortened, and the clamp 40 provides a fixed point of the bending beam. The clamp 40 is provided proximate to, but spaced from, the front ends 50*a*, 50*b* of the planar bodies 42*a*, 42*b*. In the clamped pair, the spring fingers 44*a*, 44*b* define a receiving space 90 for the conductive component 26 forward of the clamp 40, and the clamp 40 controls the size of the receiving space 90. The bases 72*a*, 72*b* of the contact beams 70*a*, 70*b* defines a width therebetween which is less than a width of the conductive component 26, such that when the conductive component 26 is inserted between the spring fingers 44*a*, 44*b*, the spring fingers 44*a*, 44*b* flex outward to allow entry of the conductive component 26 into the receiving space 90, but maintain electrical contact with the conductive component 26.

Figure 6:
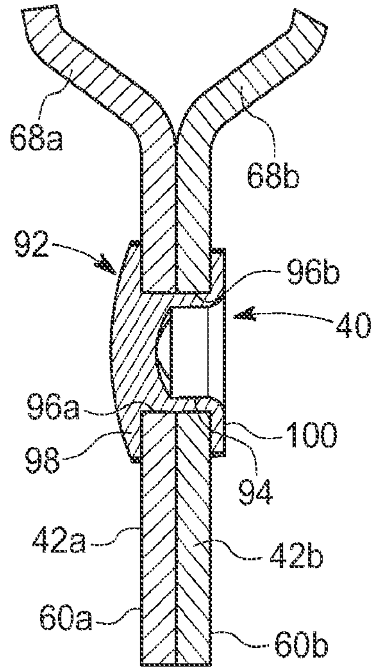
FIGS. 6 and 7 depict enlarged, partial cross-sectional view of embodiments of a clamp and the electrical contacts.
Figure 7:
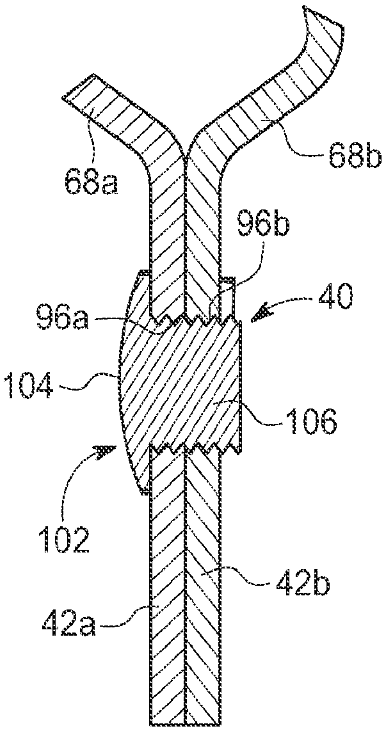

In an embodiment, as shown in FIGS. 6, the clamp 40 is provided by at least one rivet 92 having a body 94 which extends through apertures 96*a*, 96*b* in the planar bodies 42*a*, 42*b*. The rivet 92 has heads 98, 100 formed on each end of the body 94. One head 98 abuts against the side surface 60*a* of the planar body 42*a*, and the other head 100 abuts against the side surface 60*b* of the planar body 42*b*. In an embodiment, as shown in FIG. 7, the clamp 40 is provided by at least one screw 102 having a single head 104 and a body 106 depending therefrom which is threadedly connected to the apertures 96*a*, 96*b* in the planar bodies 42*a*, 42*b*. As shown, two rivets 92 or screws 102 are provided and are vertically aligned with each other, however, a single rivet 92 or screw 102 or more than two rivets 92 or screws 102 may be provided. Alternatively, the rivets 92 or screws 102 may be horizontally aligned. The side surfaces 58*a*, 58*b* of the planar bodies 42*a*, 42*b* abut against each in this embodiment, however, the planar bodies 42*a*, 42*b* may be separated from each other when the screw(s) 102 are used.

Figure 8:
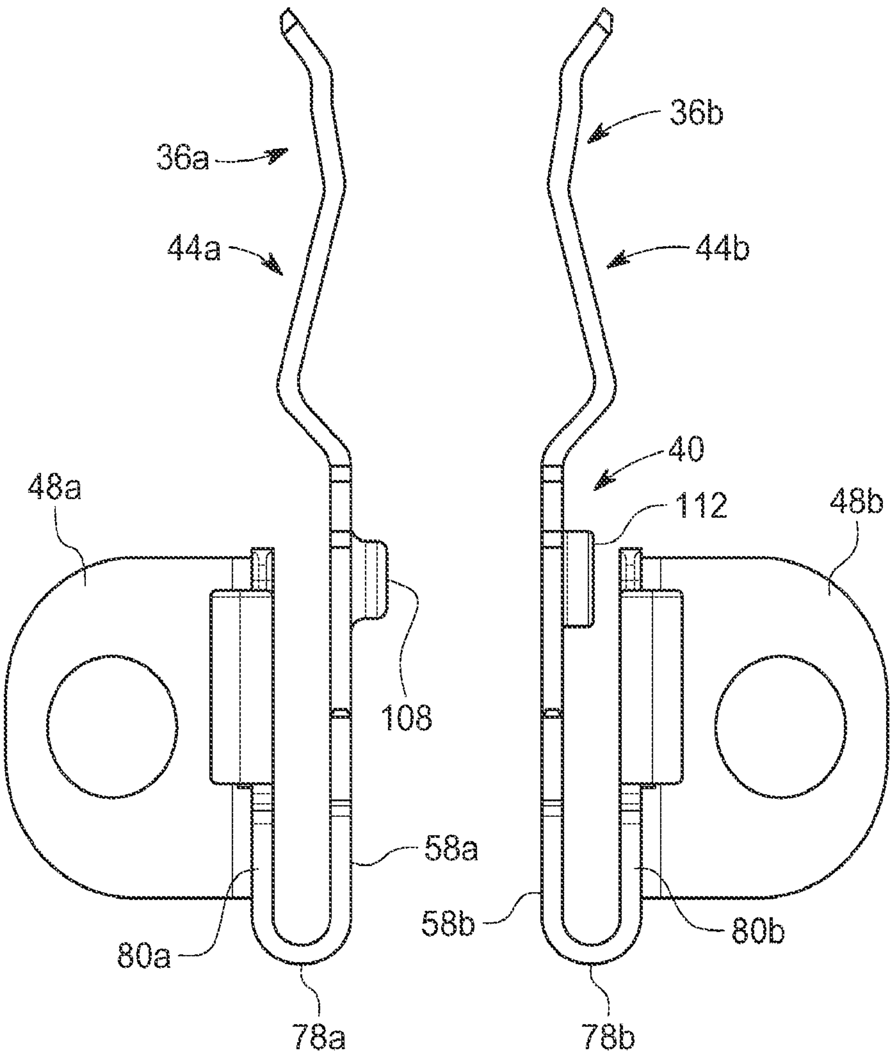
FIG. 8 depicts an exploded top plan view of electrical contacts of an electrical connector that can be provided in the electrical connector shown in FIG. 1.
Figure 9:
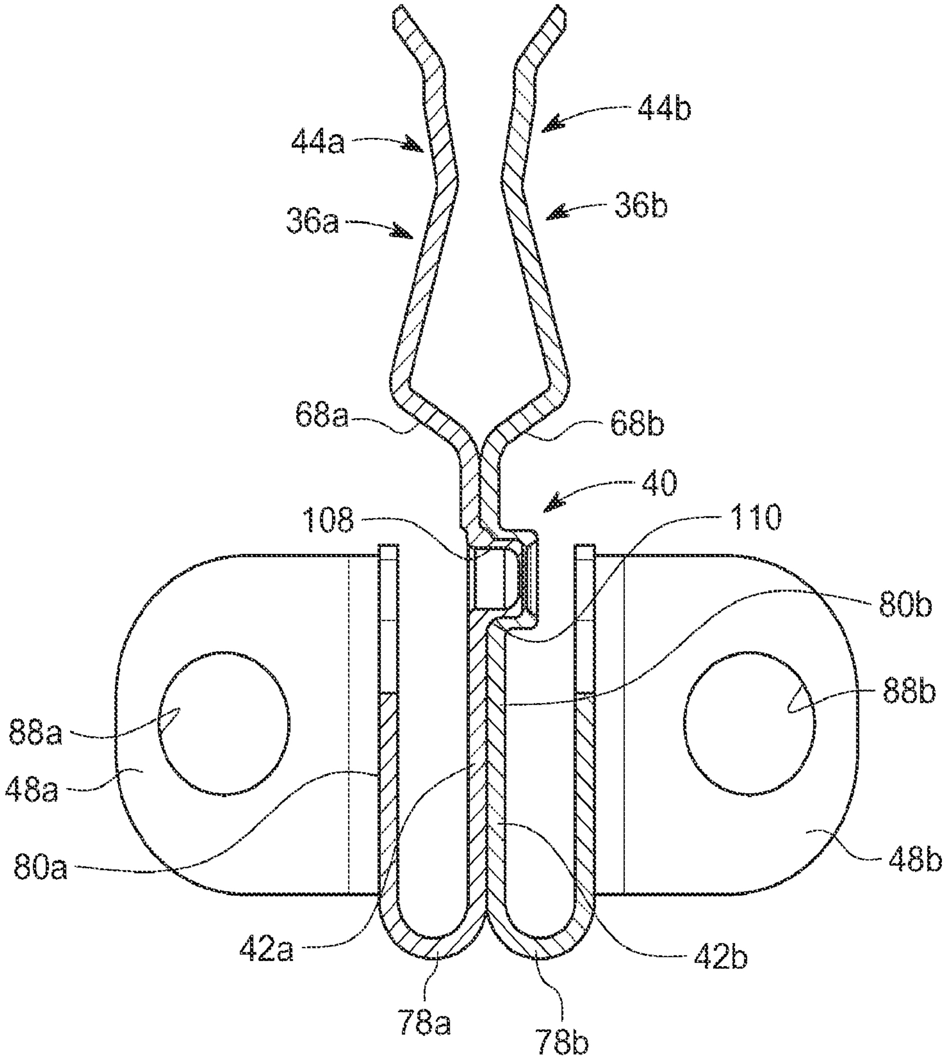
FIG. 9 depicts a cross-sectional view of the electrical contacts shown in FIG. 8, and in an assembled condition.

In an embodiment, as shown in FIGS. 8 and 9, the clamp 40 is provided by at least one projection 108 extending from the planar body 42*a* which seats within an opening 110 formed in the other planar body 42*b*. The projection 108 and the opening 110 may be press fit together to maintain the coupling of the planar bodies 42*a*, 42*b*. Alternatively, the projection 108 and the wall forming the opening 110 may be adhered or welded together. In an embodiment, the opening 110 is formed in a three-sided pocket 112. As shown, two projections 108/openings 110 are provided and are vertically aligned with each other, however, a projection 108/opening 110 or more than two projections 108/openings 110 may be provided. In an embodiment, the planar body 42*a* has one projection 108 and one opening 110, and the other body 42*b* has one corresponding opening 110 and one corresponding projection 108 for mating with the projection 108 and opening 110 of the planar body 42*a*. As shown, the side surfaces 58*a*, 58*b* of the planar bodies 42*a*, 42*b* abut against each in this embodiment; however, the side surfaces 58*a*, 58*b* of the planar bodies 42*a*, 42*b* may be spaced apart from each other.

Figure 10:
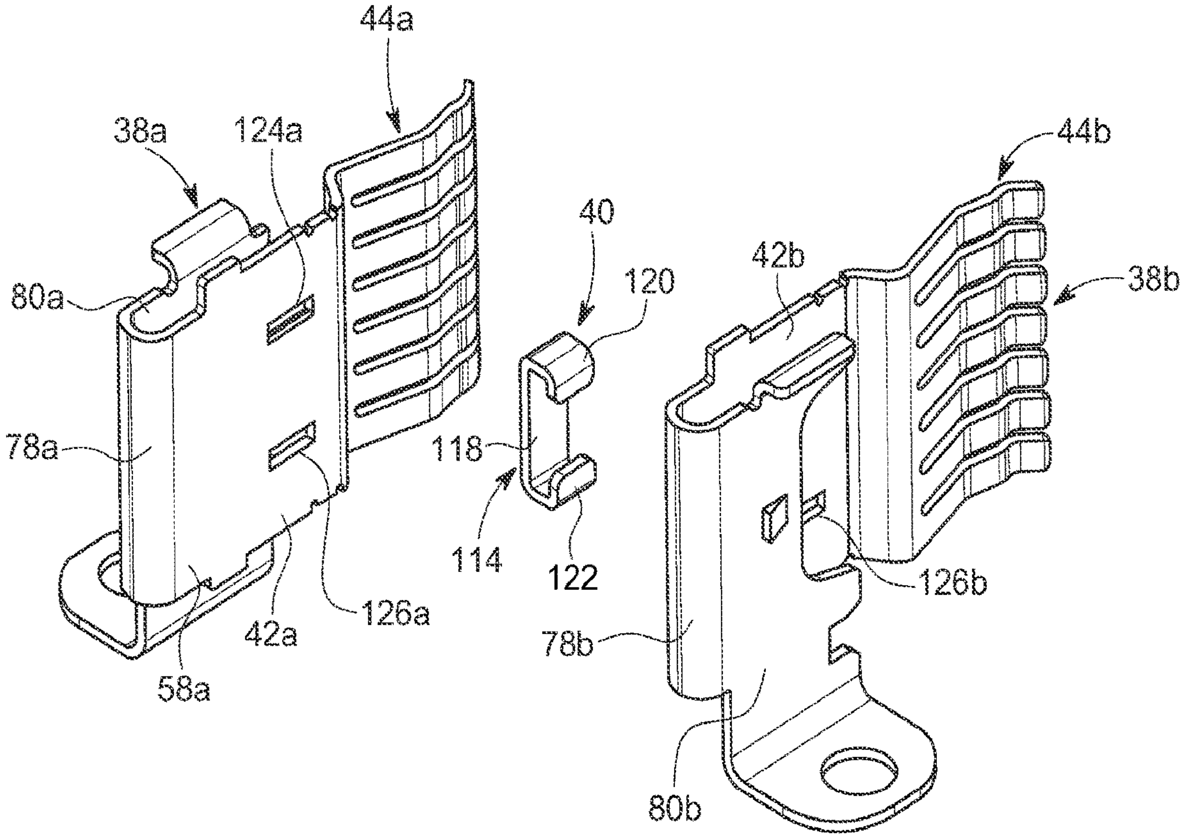
FIG. 10 depicts an exploded perspective view of electrical contacts of an electrical connector that can be provided in the electrical connector shown in FIG. 1.
Figure 11:
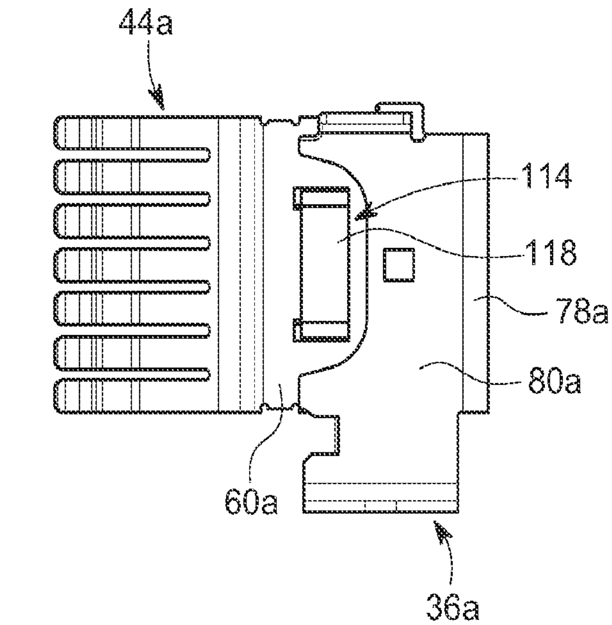
FIGS. 11 and 12 depict side elevation views of the electrical contacts of FIG. 10.
Figure 12:
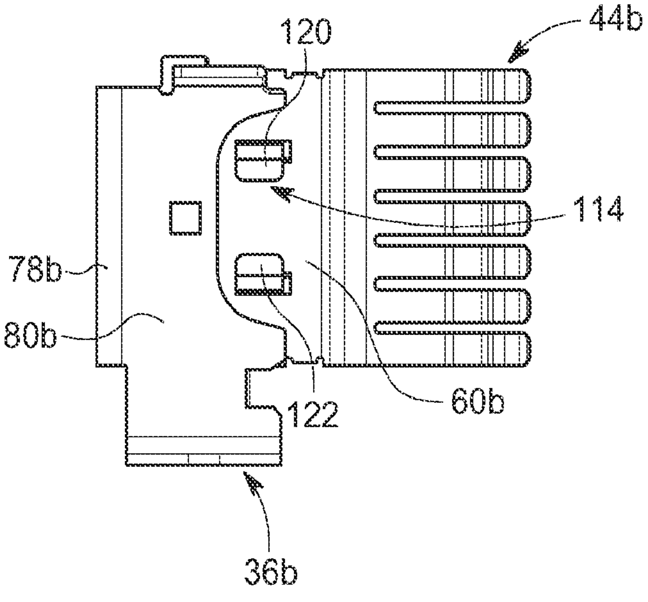

In an embodiment, as shown in FIGS. 10-12, the clamp 40 is provided by a C-shaped clip 114 having a base 116 and a pair of legs 118, 120 extending from the base. The base 116 seats against the side surface 60*a*, the leg 118 extends through apertures 124*a*, 124*b* in the planar bodies 42*a*, 42*b*, the leg 120 extends through apertures 126*a*, 126*b* in the planar bodies 42*a*, 42*b*, and ends of the legs 118, 120 are bent to seat against the side surface 60*b* of the planar body 42*b*. As shown, a single clip 114 is provided, however, more than one clip 114 may be provided. The side surfaces 58*a*, 58*b* of the planar bodies 42*a*. 42*b* abut against each in this embodiment.

Figure 13:
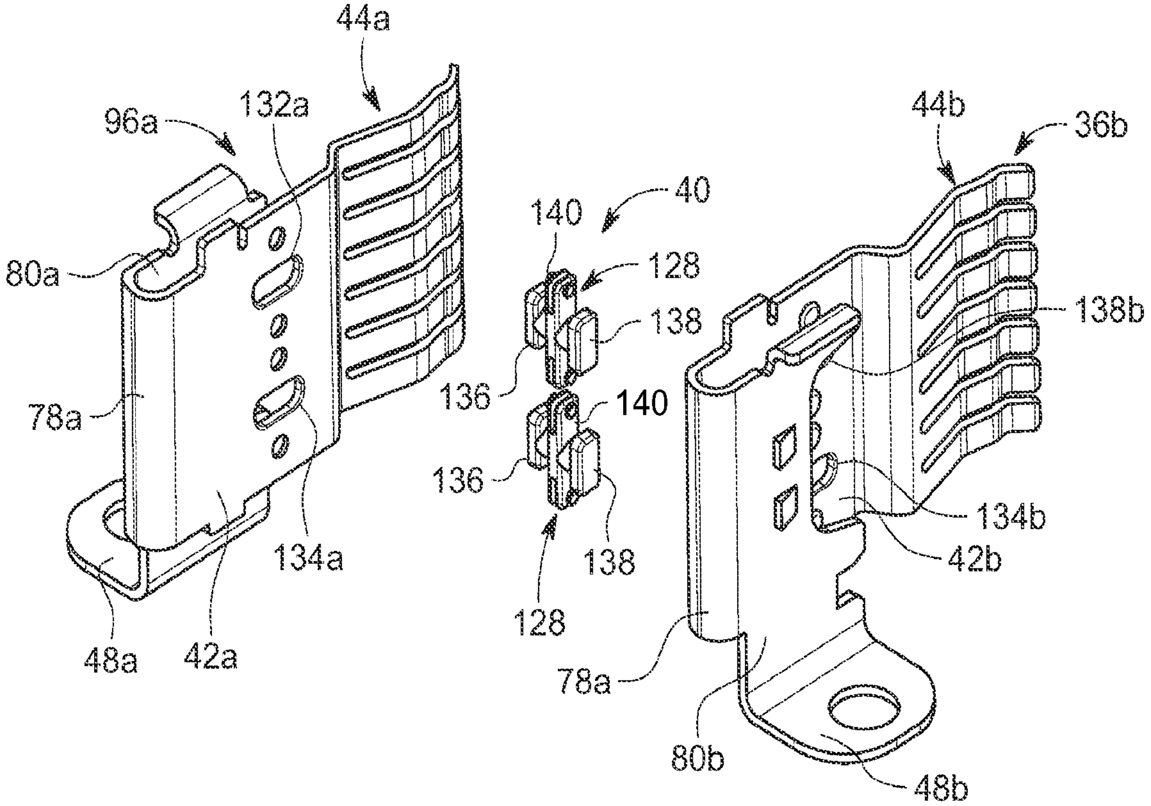
FIG. 13 depicts an exploded perspective view of electrical contacts of an electrical connector that can be provided in the electrical connector shown in FIG. 1.
Figure 14:
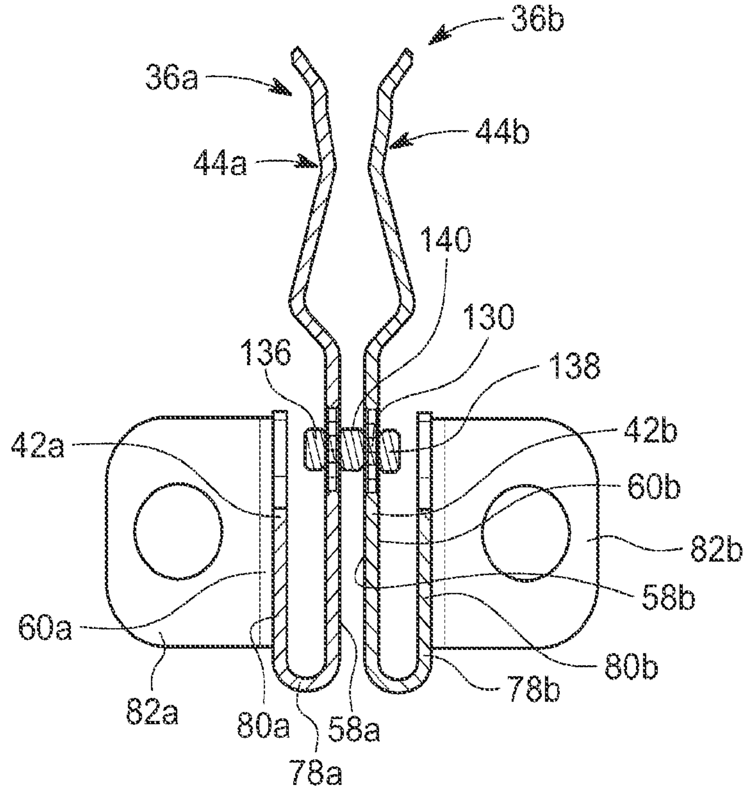
FIG. 14 depicts a cross-sectional view of the electrical contacts shown in FIG. 8, and in an assembled condition.
Figure 15:
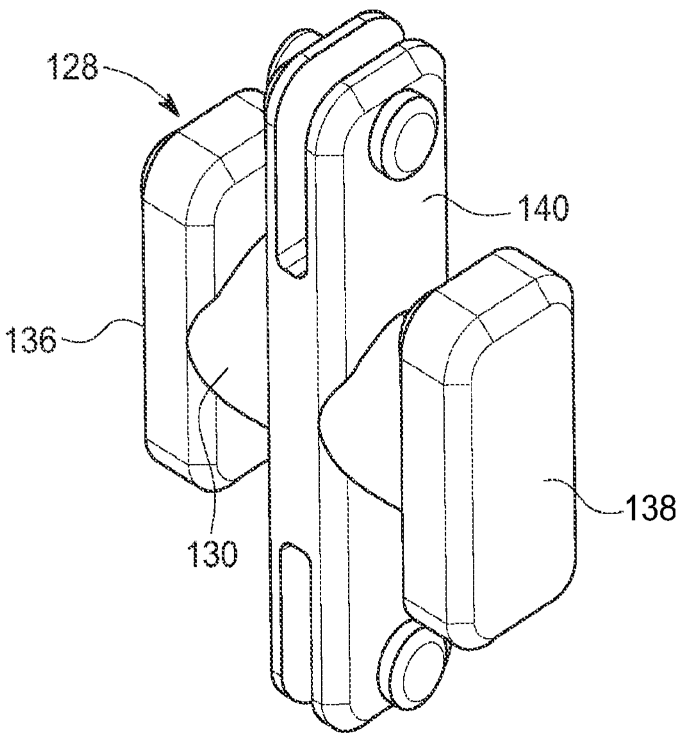
FIG. 15 depicts an exploded view of a clip shown in FIGS. 13 and 14.

In an embodiment, as shown in FIG. 13-15, the clamp 40 is provided by at least one clip 128 having a body 130 which extends through apertures 132*a*, 132*b*, 134*a*, 134*b* in the planar bodies 42*a*, 42*b*, a head 136, 138 formed on each end of the body 130, and a collar portion 140 which extends from the body 130 between the head 136, 138 and is positioned between the planar bodies 42*a*, 42*b*. Head 136 abuts against the side surface 60*a* of the planar body 42*a*, and the head 138 abuts against the side surface 60*b* of the planar body 42*b*. The planar bodies 42*a*, 42*b* are held in a spaced apart relationship by the collar portion 140. If the clip 128 is formed of a conductive material, the electrical contacts 36*a*, 36*b* are electrically coupled together. If the clip 128 is formed of a nonconductive material, the electrical contacts 36*a*, 36*b* are electrically isolated from each other. As shown, two clips 128 are provided and are vertically aligned with each other, however, a single clip 128 or more than two clips 128 may be provided.

Any other suitable clamp may also be used. In some embodiments, an urging member (not shown) may be used in place of the clamp 40. The urging member allows for some relative movement between the electrical contacts 36*a*, 36*b*, while maintaining a clamping effect.

Figure 16:
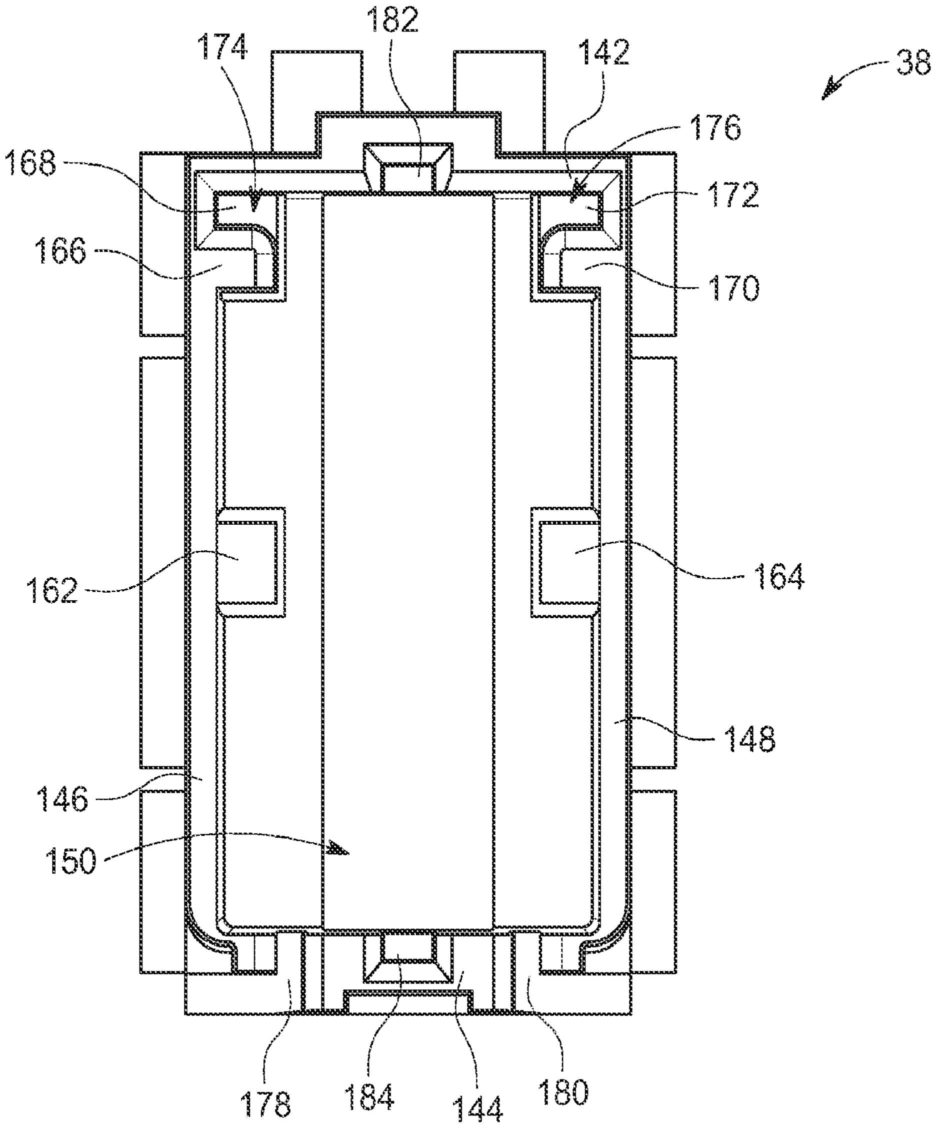
FIG. 16 depicts a rear elevation view of the electrical connector shown in FIG. 2.
Figure 17:
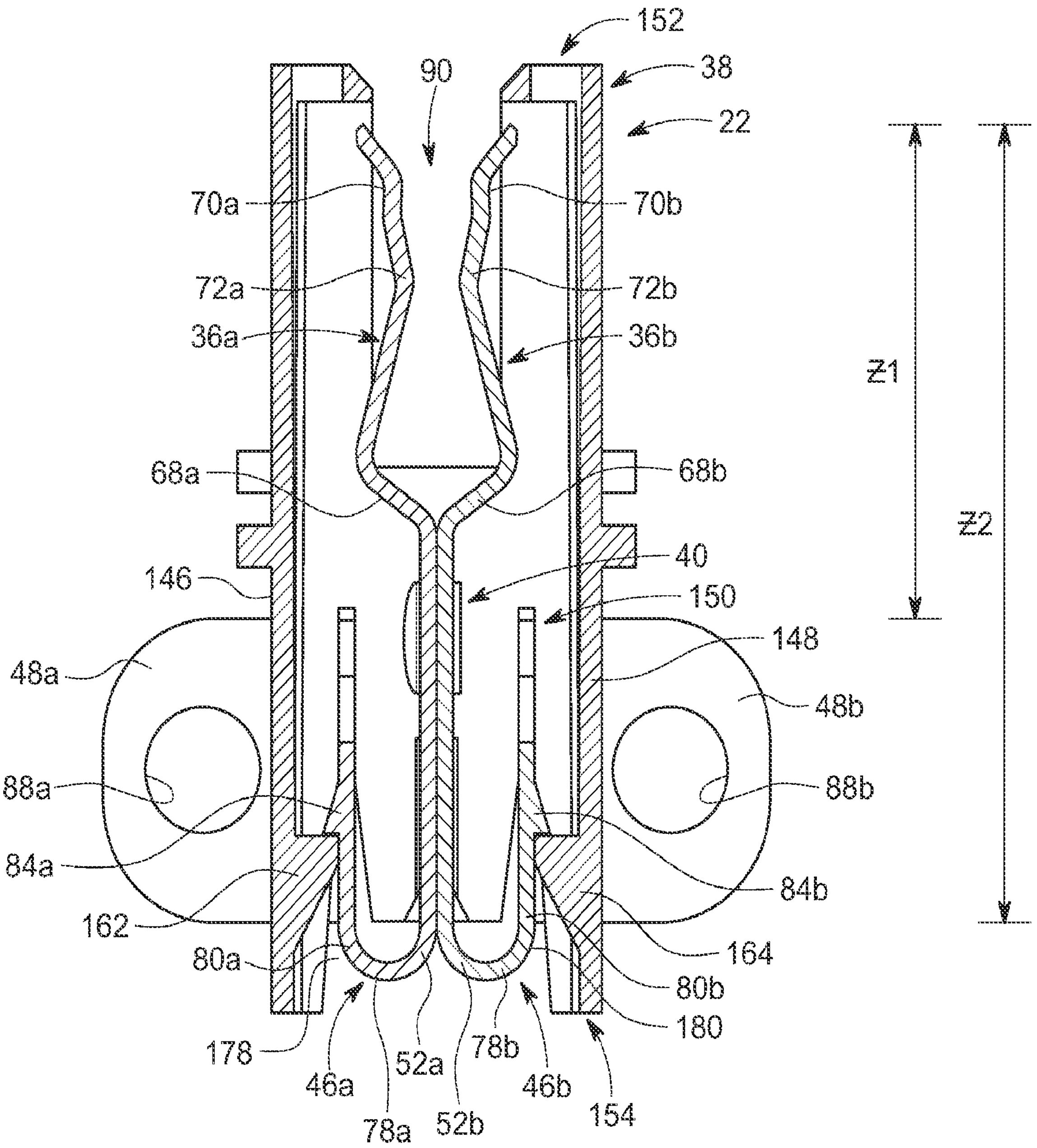
FIG. 17 depicts a cross-sectional view of the electrical connector shown in FIG. 2.

As shown in FIGS. 3, 16 and 17, the housing 38 has a top wall 142, a bottom wall 144, and side walls 146, 148 extending therebetween, which defines a cavity 150 that extends from a mating or front end 152 of the housing 38 to a mounting or rear end 154 of the housing 38. A longitudinal axis extends along the housing 38 from the mating end 152 to the mounting end 154. The front and rear ends of the cavity 150 are open to define a front opening 158 and a rear opening 160. Each top and bottom wall 142, 144 has an elongated slot 156 (only shown for top wall 142) which extends from the mating end 152 toward the mounting end 154 and which is in communication with the cavity 150 and the front opening 158. In the illustrated embodiment, the front opening 158 and the slots 156 have dimensions to accommodate receipt of the conductive component 26 therein when the mating edge 34 of the conductive component 26 is advanced into the front opening 158 and the slots 156 along a mating direction M1. The mating direction M1 extends substantially parallel to the longitudinal axis of the housing 38.

As shown in FIGS. 16 and 17, the housing 38 includes engagements which engage with the engagements of the clamped pair of electrical contacts 36*a*, 36*b*. This coupling of the engagements prevents the mounting portions 46*a*, 46*b* from moving relative to the housing 38, while the clamped planar bodies 42*a*, 42*b* can move in a generally lateral direction relative to the housing 38. The housing 38 has a first engagement in the form of a projection 162 extending inward from an inner side surface of the side wall 146 which engages with the projection 84*a* on the second section 80*a* of the electrical contact 36*a*, and a projection 164 extending inward from an inner side surface of the side wall 148 which engages with the projection 84*b* on the second section 80*b* of the electrical contact 36*b*. The projection 162, 164 on each side wall 146, 148 may be formed as a barb having which has an angled rear face which is angled relative to the plane defined by the respective side wall 146, 148, and a front face which is perpendicular to the respective side wall 146, 148. As shown, the rear and front surfaces are spaced from each other by a surface which is parallel to the respective side wall 146, 148. The housing 38 has a second engagement provided by a first wall 166 which extends inward from the side wall 146 and into the cavity 150, is proximate to, but spaced from the top wall 142, and extends longitudinally, and a first front wall 168 at a front end of the first wall 166, and provided by a second wall 170 which extends inward from the side wall 148 and into the cavity 150, is proximate to, but spaced from the top wall 142, and extends longitudinally, and a second front wall 172 at a front end of the second wall 170. The walls 166, 168 form a first channel 174 which receives the flange 86*a* of the electrical contact 36*a*, and the walls 170, 172 form a second channel 176 which receives the flange 86*b* of the electrical contact 36*b*.

The housing further includes spaced apart slots 178, 180 through the bottom wall 144 of the housing 38 which extend longitudinally from the mounting end 154 toward the mating end 152 and are in communication with the cavity 150. The slots 178, 180 receive the sections 82*a*, 82*b* of the mounting portions 46*a*, 46*b* therethrough. The slots 178, 180 have a lateral dimension which prevents lateral movement of the second leg portions 80*a*, 80*b* relative to the housing 38.

The housing 38 further includes a plurality of surfaces in the top wall 142 forming an elongated recess 182 extending longitudinally from the mounting end 154 toward the mating end 152, and a plurality of surfaces in the bottom wall 144 forming an elongated recess 184 extending longitudinally from the mounting end 154 toward the mating end 152. The upper tabs 64*a*, 64*b* are received in the recess 182, and the lower tabs 66*a*, 66*b* are received in the recess 184. The recess 182 has a width which is slightly wider than the combined widths of the tabs 64*a*, 64*b*, and the recess 184 has a width which is slightly wider than the combined widths of the tabs 66*a*, 66*b*.

The clamped electrical contacts 36*a*, 36*b* are inserted into the housing 38 by first inserting the spring fingers 44*a*, 44*b* through the mounting end 154 of the housing 38. The flanges 86*a*, 86*b* slide along the channels 174, 176, the tabs 64*a*, 64*b* slide along the recess 182, the tabs 66*a*, 66*b* slide along the recess 184, the section 82*a* of the mounting portion 46*a* slides along the slot 178 and extends downward from the bottom wall 144 of the housing 38, and the section 82*b* of the mounting portion 46*b* slides along the slot 180 and extends downward from the bottom wall 144 of the housing 38. The angled faces of the projections 84*a*, 84*b* on the electrical contacts 36*a*, 36*b* contact the angled faces on the projections 162, 164 on the housing 38, and upon continued insertion, the projections 84*a*, 84*b* move past the projections 162, 164. Once past, the flat faces of the projections 84*a*, 84*b*, 162, 164 abut against each other, and the front end of the flanges 86*a*, 86*b* abut against the front walls 168, 172. The clamped electrical contacts 36*a*, 36*b* are thus prevented from being easily removed from the housing 38. With the clamped electrical contacts 36*a*, 36*b* positioned within the housing 38, the mounting portions 46*a*, 46*b* are rigidly affixed to the housing 38, and the planar base planar bodies 42*a*, 42*b* are cantilevered from the first sections 78*a*, 78*b*. The clamped electrical contacts 36*a*, 36*b* inversely face each other.

To form the electrical system 20, the electrical connector 22 is electrically coupled to the electrical element 24 by securing the mounting flanges 48*a*, 48*b* to the electrical element 24, for example by screws 186 extending through the openings 88*a*, 88*b* of the mounting flanges 48*a*, 48*b* and into the electrical element 24. Thereafter, the conductive component 26 is inserted through the mating end 152 of the housing 38, and into the receiving space 90 to engage with the contact beams 70*a*, 70*b* on each side 30, 32 thereof to form an electrical connection therebetween.

Figure 18:
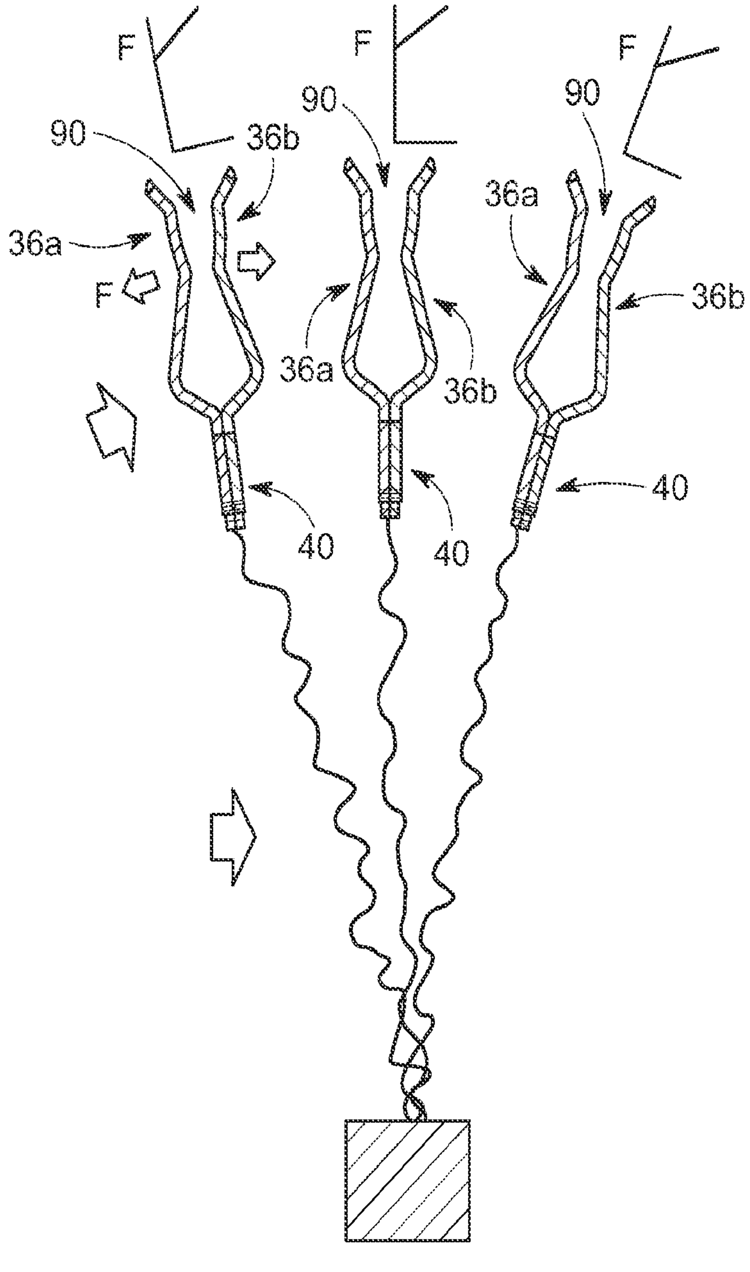
FIG. 18 depicts a schematic representation.
Figure 19:
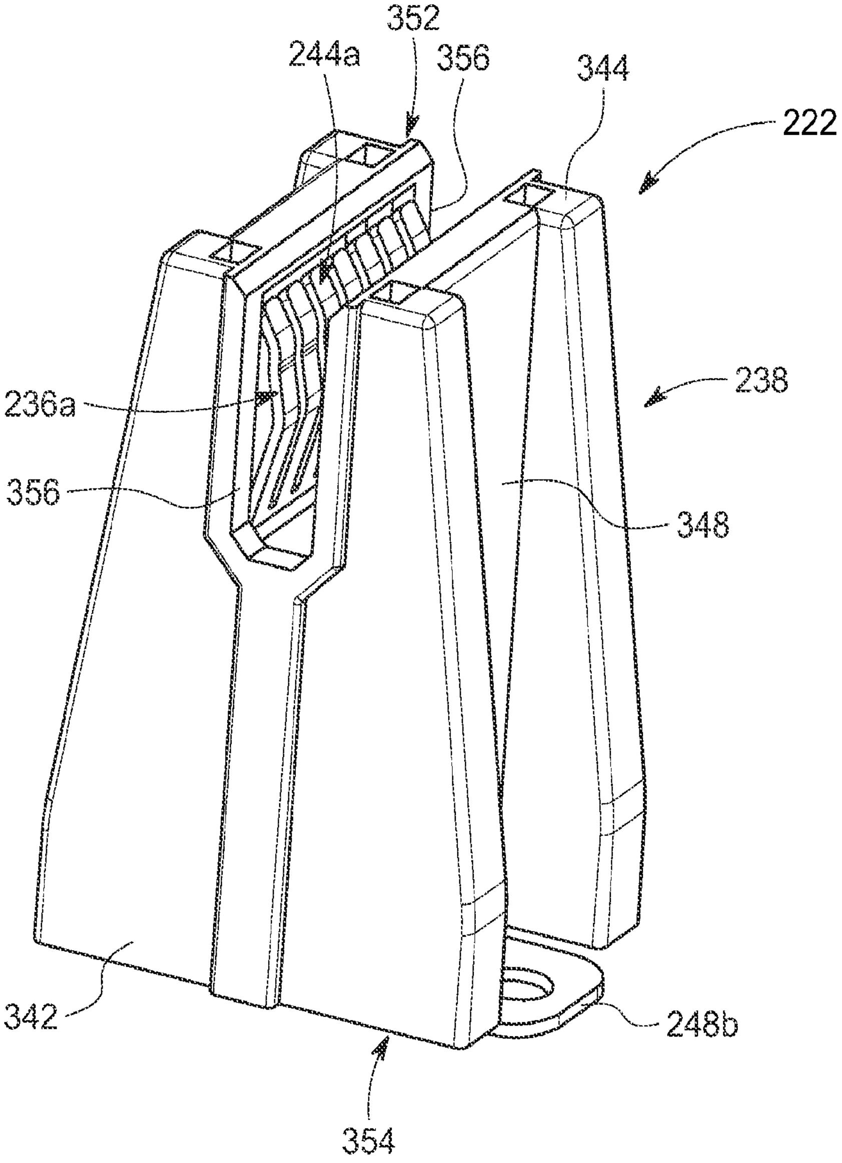
FIG. 19 depicts a perspective view of another embodiment of an electrical connector which can be used with the electrical element, and a conductive component shown in FIG. 1.

The electrical system 20 defines first and second deflection zones Z1 and Z2, see FIG. 17. The first deflection zone Z1 extends between the clamp 40 and the front ends 75*a*, 75*b* of the spring fingers 44*a*, 44*b*. The second deflection zone Z2 extends between the front ends 75*a*, 75*b* of the spring fingers 44*a*, 44*b* and the rear ends 52*a*, 52*b* of the clamped planar bodies 42*a*, 42*b*. When the conductive component 26 is being engaged with the contact beams 70*a*, 70*b*, the contact beams 70*a*, 70*b* deflect in the first deflection zone Z1. The contact beams 70*a*, 70*b* provide for a stable normal force on the conductive component 26. When the conductive component 26 is received within the receiving space 90 but the conductive component 26 is not directly aligned with the receiving space 90, the second deflection zone Z2 allows for a degree of misalignment between the electrical connector 22 and the conductive component 26. If misaligned, the free standing beam formed by the clamped planar bodies 42*a*, 42*b* and the spring fingers 44*a*, 44*b* will deflect in a lateral direction around the longitudinal axes 62*a*, 62*b* within the housing 38 in the second deflection zone Z2 and relative to the mounting portions 46*a*, 46*b* and the electrical element 24. The widths of the recesses 182, 184 limit the amount of movement of the planar bodies 42*a*, 42*b* and the spring fingers 44*a*, 44*b* in the second deflection zone Z2 since the tabs 64*a*, 64*b*, 66*a*, 66*b* seat within the recesses 182, 184. This is representationally shown in FIG. 18. In this arrangement and as shown in the figures, the normal force exhibited on the conductive component 26 remains constant as the clamped electrical contacts 36*a*, 36*b* and the spring fingers 44*a*, 44*b* move in the lateral direction. As shown, the size of the receiving space 90 remains constant during the lateral deflection of the clamped electrical contacts 36*a*, 36*b* and the spring fingers 44*a*, 44*b*, and thus the force exhibited on the conductive component 26 will remain the same. If the electrical contacts were to float independently of each other, the electrical contacts will exhibit a higher spring force.

A pair of clamped electrical contacts 36*a*, 36*b* are shown, but multiple pairs of clamped electrical contacts 36*a*, 36*b* are contemplated.

Attention is invited to the embodiment of the electrical connector 222 shown in FIGS. 19-26. The electrical connector 222 and the electrical element 24 are oriented with respect to mutually aligned axes that include a longitudinal axis, an elevation (or vertical) axis, and a lateral (or horizontal) axis. This arrangement is typically called a "vertical" system.

Each electrical contact 236*a*, 236*b* has a connecting portion formed of a substantially rectangular-shaped planar body 242*a*, 242*b* and spring fingers 244*a*, 244*b* extending from the planar body 242*a*, 242*b*, and further has a mounting portion 246*a*, 246*b* extending from a top end of the planar body 242*a*, 242*b*, and a mounting flange 248*a*, 248*b* extending from the planar body 242*a*, 242*b*. The mounting portion 246*a*, 246*b* is fixed to the housing 238. The mounting flanges 248*a*, 248*b* are fixed to the electrical element 24. The planar bodies 242*a*, 242*b* and the spring fingers 244*a*, 244*b*, when clamped together by the clamp 40 as described herein, and the housing 238 form a free standing beam relative to the mounting flanges 248*a*, 248*b*. For purposes of clarity, the components of electrical contact 236*a* are described herein, and the like components of electrical contact 236*b* are denoted with the same reference numerals except with a "b" thereafter instead of an "a".

Figure 21:
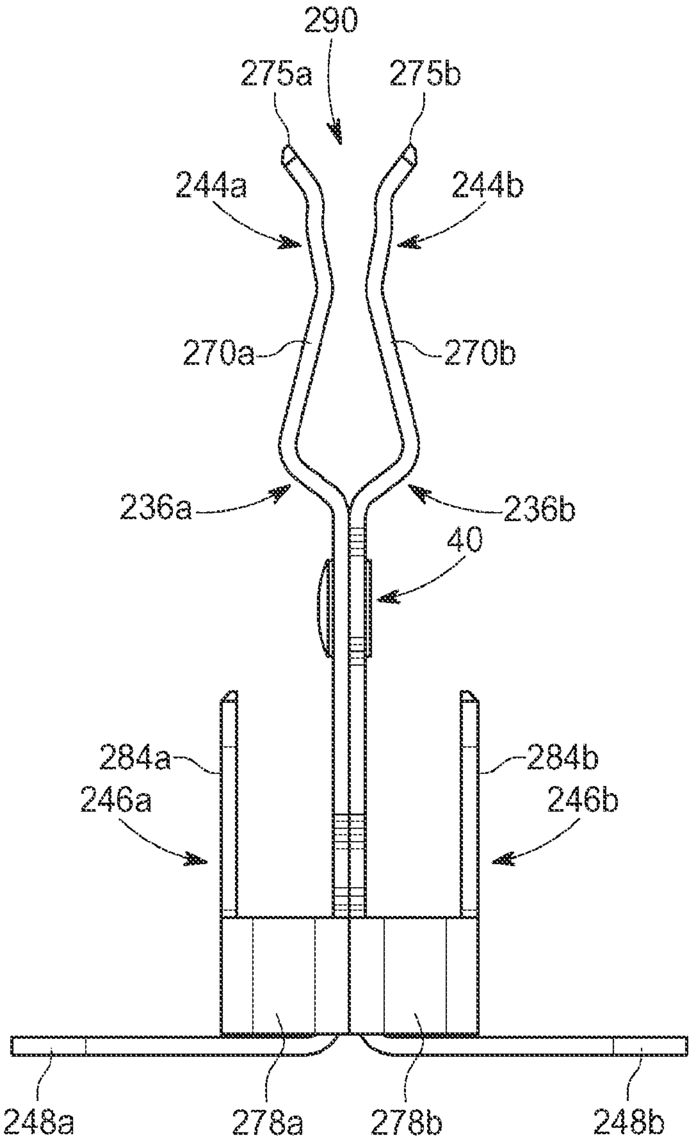
FIG. 21 depicts a side elevation view of clamped electrical contacts of the electrical connector shown in FIG. 19.
Figure 23:
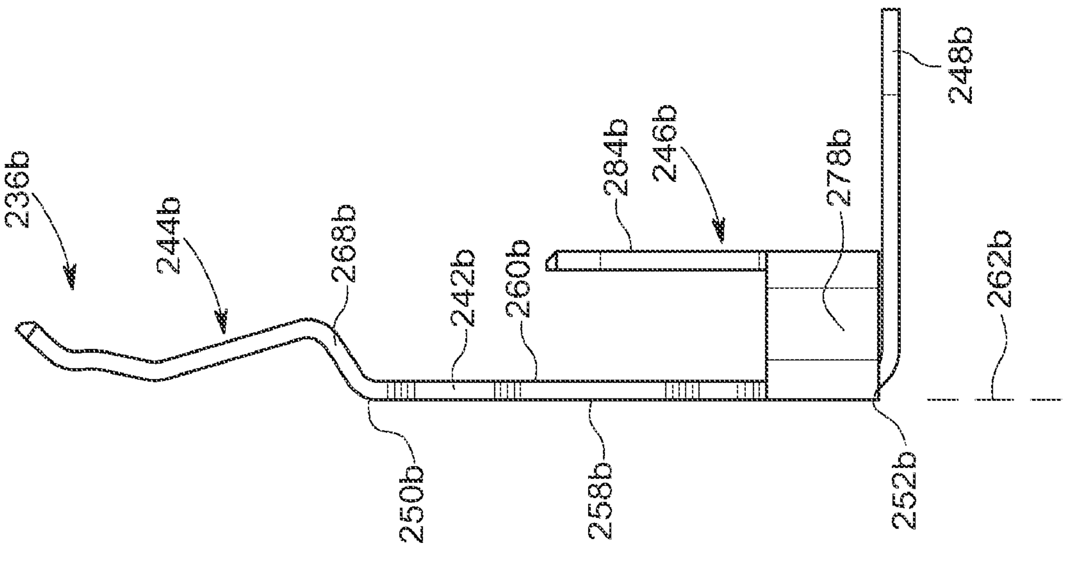
FIGS. 22 and 23 depict side elevation views of the electrical contacts of FIG. 21.
Figure 22:
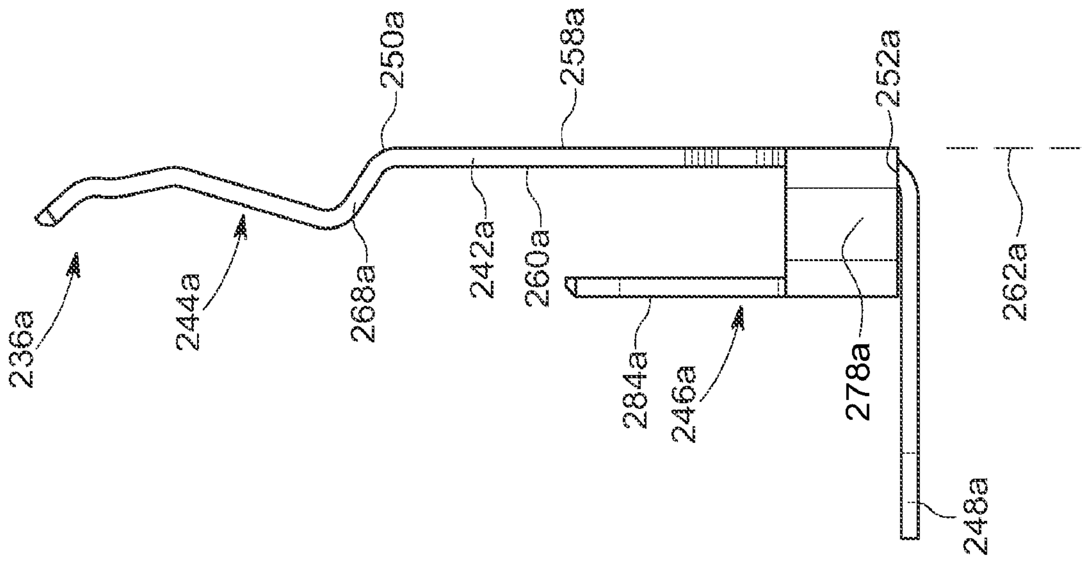

As shown in FIGS. 21-23, the planar body 242*a* has a top end 250*a*, an opposite bottom end 252*a*, and side edges 254*a*, 256*a* extending between the top and bottom ends 250*a*, 252*a* which define a first side surface 258*a* and a second side surface 260*a*. A longitudinal axis 262*a* is defined by the planar body 242*a* from the top end 250*a* to the bottom end 252*a*. The side surfaces 258*a*, 260*a* coincide with respective planes that extend along the longitudinal and elevation axes and are parallel to each other. A first side tab 264*a* extends outward from the side edge 254*a*, and a second side tab 266*a* extends outward from the side edge 256*a*. Each tab 264*a*, 266*a* is coplanar with the planar body section 242*a*.

The spring fingers 244*a* extend from the top end 250*a* of the planar body 242*a* and are identically formed to spring fingers 44*a*, 44*b*. As such, the specifics are not repeated herein.

The mounting portion 246*a* has a first section 278*a* which extends perpendicularly from each side edge 254*a*, 256*a* of the planar body 242*a* and a second section 280*a* which is planar, extends perpendicularly from the first section 278*a* and overlaps the side 260*a* of the planar body 242*a*, and is parallel to the planar body 42*a*. The second section 280*a* extends parallel to the longitudinal axis 262*a*. The first section 278*a* may be U-shaped. The second section 280*a* has an engagement which engages with the housing 238 to prevent the movement of the mounting portion 246*a* relative to the housing 238. The engagement may be provided by a projection 284*a* that extends upwardly from each second section 280*a* and is coplanar with the second section 280*a*. The projection 284*a* may be formed as an elongated arm having a hook-shaped end. The tab 264*a* is proximate to, but spaced from, an upper end of the first section 278*a*.

The mounting flange 248*a* extends from the bottom end 252*a* of the planar body 242*a* and is perpendicular thereto. The mounting flange 248*a* is below a lower end of the second section 280*a*. An opening 288*a* is provided through the mounting flange 248*a*.

The electrical contacts 236*a*, 236*b* are clamped together by the clamp 40 (anyone of the clamps 40 shown in FIGS. 6-15, or any other suitable clamp, may be used) to form a clamped pair prior to insertion into the housing 238. In the clamped pair, the side surfaces 258*a*, 258*b* of the electrical contacts 236*a*, 236*b* face each other such that the planar bodies 242*a*, 242*b* are parallel to each other, the rear walls 268*a*, 268*b* of the spring fingers 244*a*, 244*b* angle outward from each other, the first sections 278*a*, 278*b* extend outward from each other, and the mounting flanges 248*a*, 248*b* extend outward from each other. The planar bodies 242*a*, 242*b* are coupled together by the clamp 40 to prevent relative movement between the planar bodies 242*a*, 242*b*. The planar bodies 242*a*, 242*b* and the mounting portions 246*a*, 246*b* are cantilevered from the mounting flanges 248*a*, 248*b*, and the planar bodies 242*a*, 242*b* define a bending beam. The clamp 40 effectively alters the bending or flexing of the electrical contacts 236*a*, 236*b* when mated. The bending arm is essentially shortened, and the clamp 40 provides a fixed point of the bending beam. The clamp 40 is provided proximate to, but spaced from, the top ends 250*a*, 250*b* of the planar bodies 242*a*, 242*b*.

Figure 20:
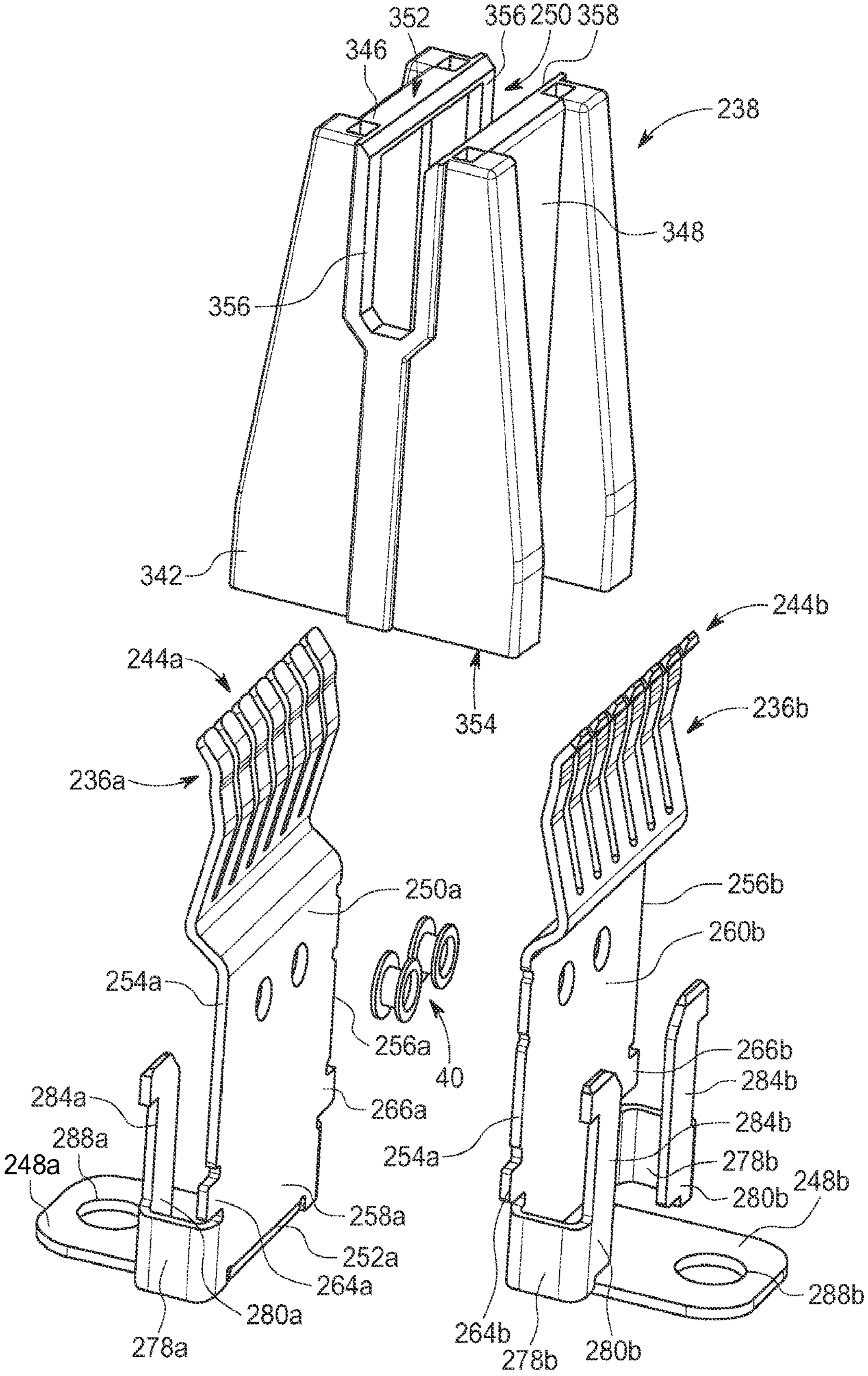
FIG. 20 depicts an exploded perspective view of the electrical connector shown in FIG. 19.
Figure 24:
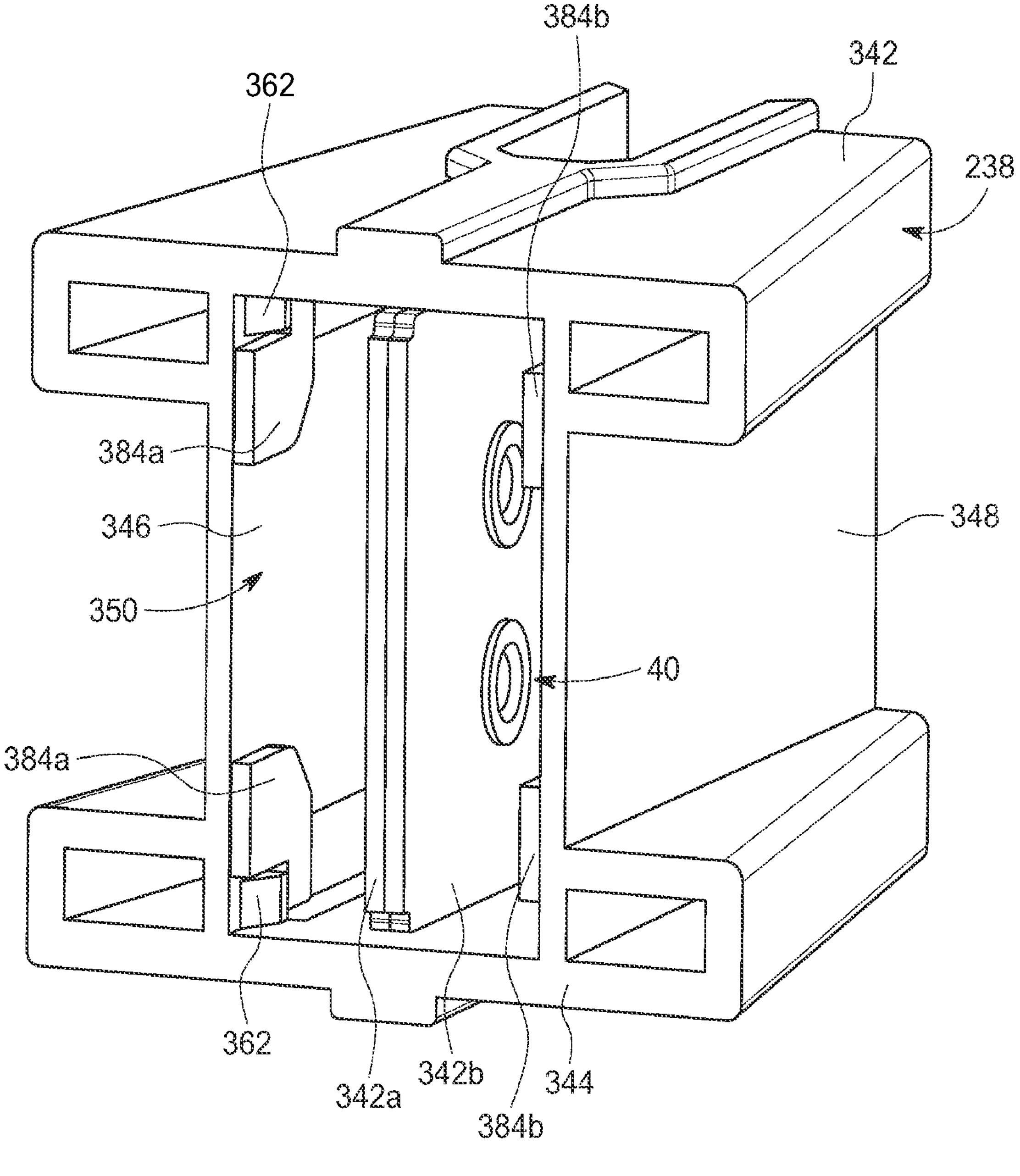
FIG. 24 depicts a cross-sectional view of the electrical connector shown in FIG. 19 and shown in perspective.
Figure 25:
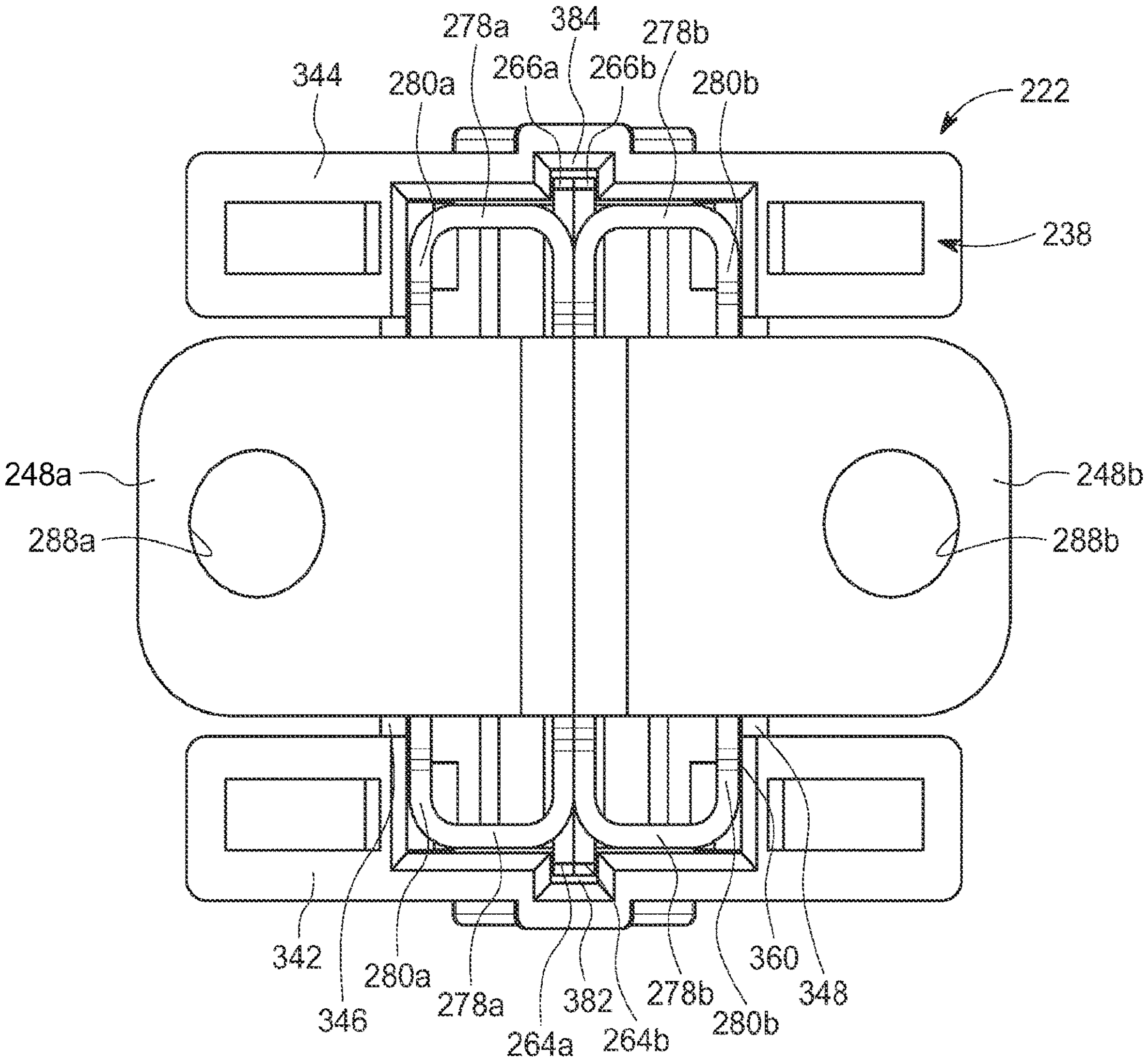
FIG. 25 depicts a bottom plan view of the electrical connector shown in FIG. 19.

As shown in FIGS. 20, 24 and 25, the housing 238 has a side wall 342, an opposite side wall 344, and side walls 346, 348 extending therebetween, which defines a cavity 350 that extends from a mating or top end 352 of the housing 238 to a mounting or bottom end 354 of the housing 238. A longitudinal axis extends along the housing 238 from the mating end 352 to the mounting end 354. The front and rear ends of the cavity 350 are open to define a top opening 358 and a bottom opening 360. Each side wall 342, 344 has an elongated slot 356 which extends from the mating end 352 toward the mounting end 354 and which is in communication with the cavity 350 and the top opening 358. In the illustrated embodiment, the top opening 358 and the slots 356 have dimensions to accommodate receipt of the conductive component 26 therein when the mating edge 34 of the conductive component 26 is advanced into the top opening 358 and the slots 356 along a mating direction. The mating direction extends substantially parallel to the longitudinal axis of the housing 238.

The housing 238 includes an engagement which engages with the engagement of the clamped pair of electrical contacts 236*a*, 236*b*. This coupling of the engagements prevents the planar bodies 242*a*, 242*b* and the mounting portions 246*a*, 246*b* from moving relative to the housing 238. The housing 238 has an engagement in the form of projections 362 extending inward from an inner side surface of the side wall 346 which engage with the respective projection 284 on the second section 280*a* of the electrical contact 236*a*, and projections (not shown) extending inward from an inner side surface of the side wall 348 which engage with the respective projection 284*b* on the second section 280*b* of the electrical contact 236*b*. The projection 362, 364 on each side wall 346, 348 may be formed as a barb having which has an angled face which is angled relative to the plane defined by the respective side wall 346, 348, and a planar face which is perpendicular to the respective side wall 346, 348.

The housing 238 further includes a plurality of surfaces in the side wall 342 forming an elongated recess 382 extending longitudinally from the mounting end 354 toward the mating end 352, and a plurality of surfaces in the side wall 344 forming an elongated recess 384 extending longitudinally from the mounting end 354 toward the mating end 352. The tabs 264*a*, 264*b* are received in the recess 382, and the tabs 266*a*, 266*b* are received in the recess 384. The recess 382 has a width which is slightly wider than the combined widths of the tabs 264*a*, 264*b*, and the recess 384 has a width which is slightly wider than the combined widths of the tabs 266*a*, 266*b*.

The clamped electrical contacts 236*a*, 236*b* are inserted into the housing 238 by first inserting the spring fingers 244*a*, 244*b* through the mounting end 354 of the housing 238. Outer surfaces of the projections 284*a* and the second sections 280*a* slide along an inner surface of the side wall 346, outer surfaces of the projections 284*b* and the second sections 280*b* slide along an inner surface of the side wall 348, the tabs 264*a*, 264*b* slide along the recess 382, and the tabs 266*a*, 266*b* slide along the recess 384. The hook-shaped ends of the projections 284*a*, 284*b* on the electrical contacts 236*a*, 236*b* engage with the projections 362 on the housing 238. The clamped electrical contacts 236*a*, 236*b* are thus prevented from being easily removed from the housing 238. With the clamped electrical contacts 236*a*, 236*b* positioned within the housing 238, the mounting portions 246*a*, 246*b* are rigidly affixed to the housing 238. The clamped electrical contacts 236*a*, 236*b* inversely face each other.

Figure 26:
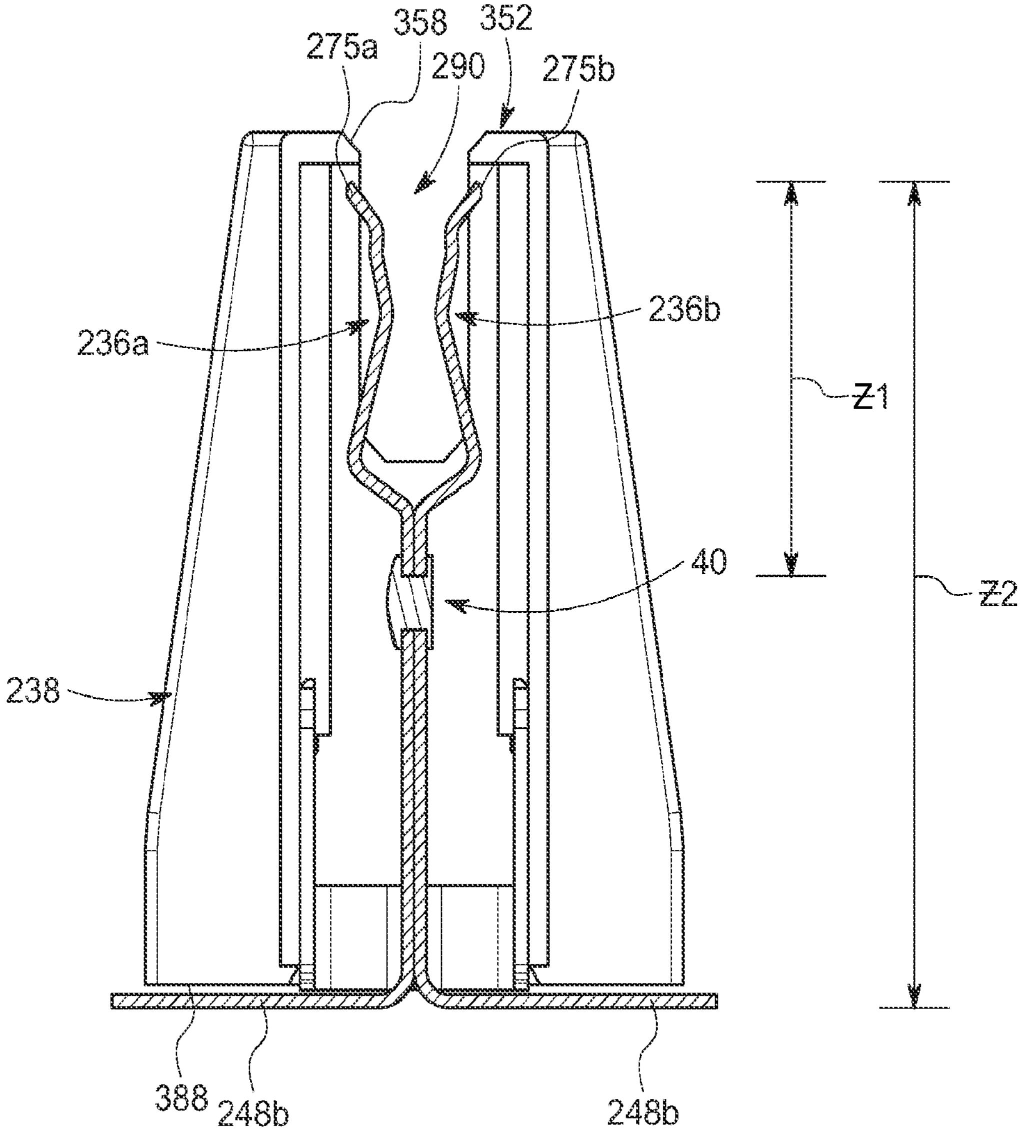
FIG. 26 depicts a cross-sectional view of the electrical connector shown in FIG. 19.
Figure 27:
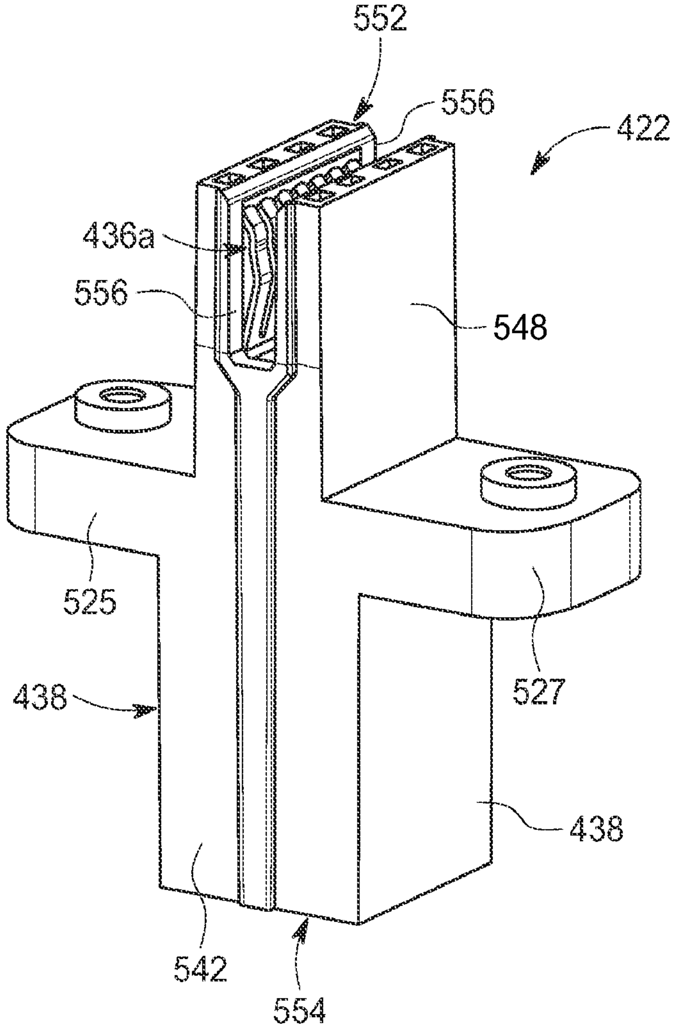
FIG. 27 depicts a perspective view of another embodiment of an electrical connector which can be used with the electrical element, and a conductive component shown in FIG. 1.
Figure 28:
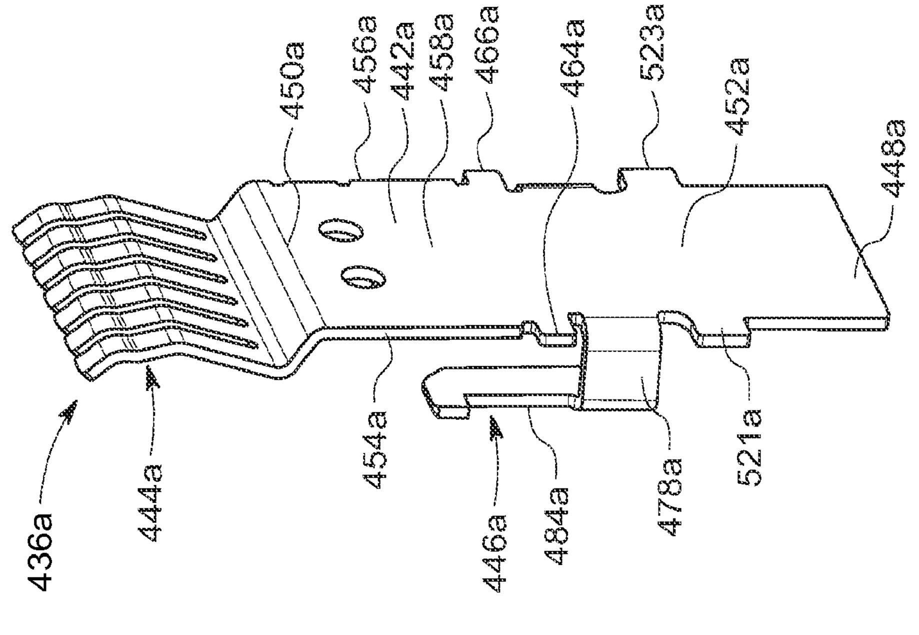
FIGS. 28 and 29 depict side elevation views of electrical contacts of the electrical connector shown in FIG. 27.
Figure 29:
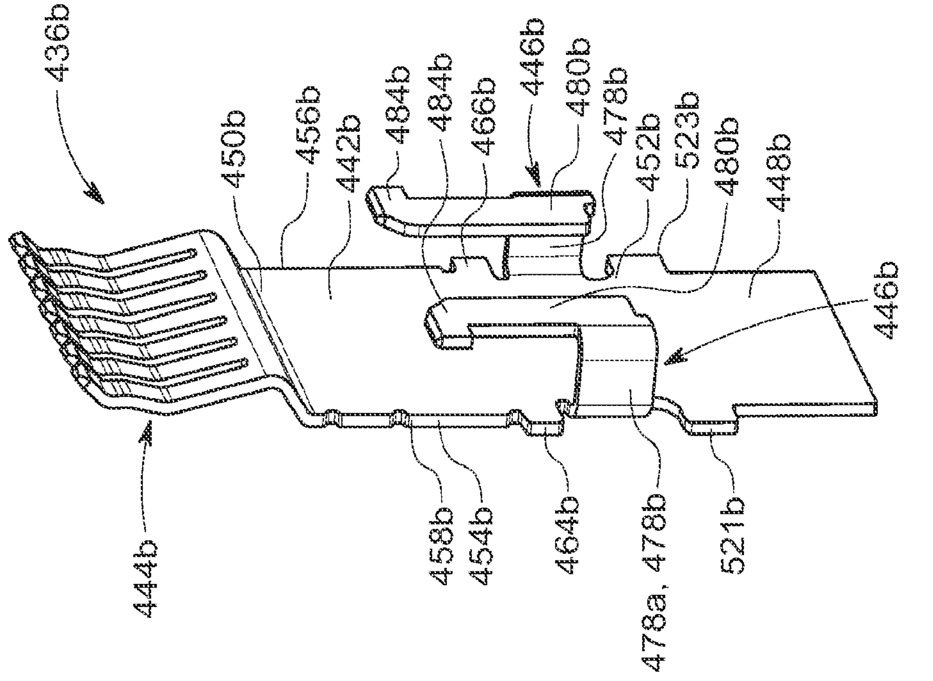
Figure 30:
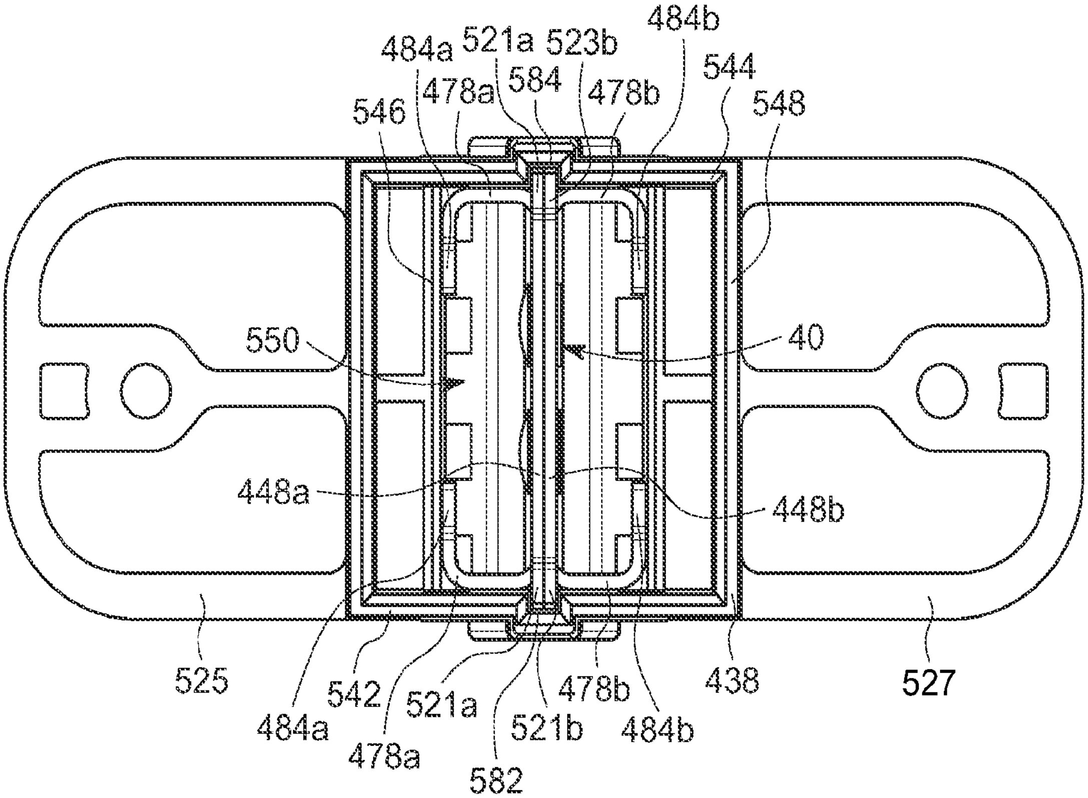
FIG. 30 depicts a bottom plan view of the electrical connector shown in FIG. 27.
Figure 31:
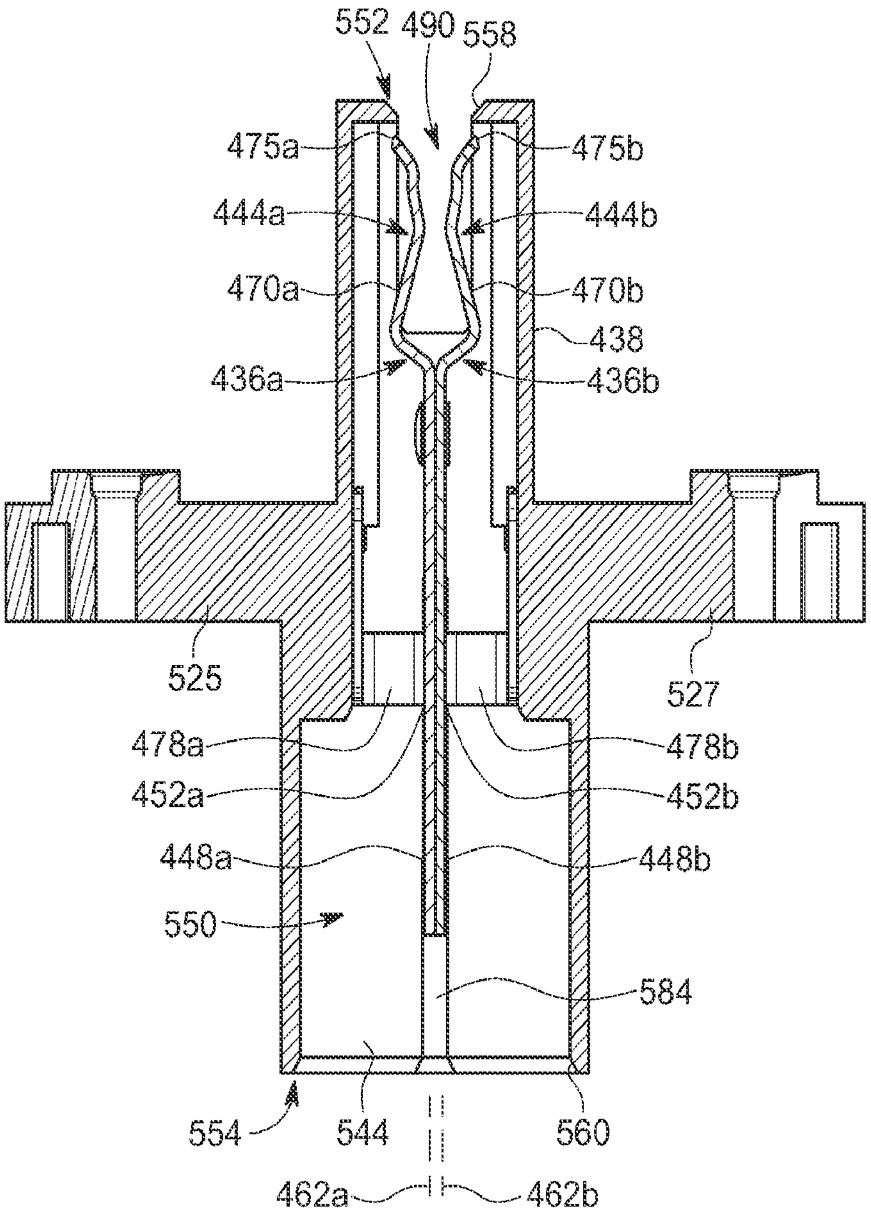
FIGS. 31 and 32 depict cross-sectional views of the electrical connector shown in FIG. 27.
Figure 32:
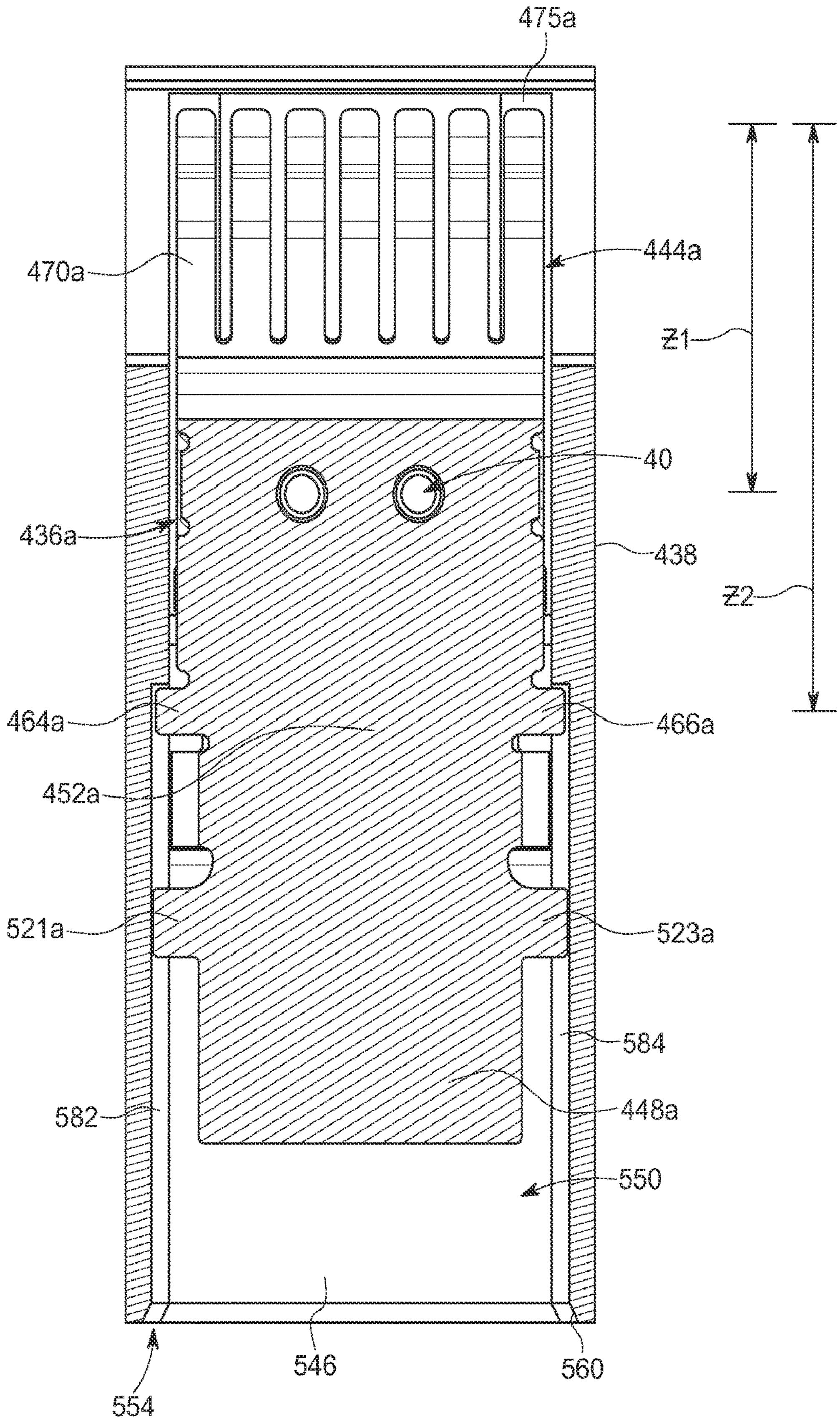

To form the electrical system, the electrical connector 222 is electrically coupled to the electrical element 24 by securing the mounting flanges 248*a*, 248*b* to the electrical element 24, for example by screws extending through the openings 288*a*, 288*b* of the mounting flanges 248*a*, 248*b* and into the electrical element 24. In this embodiment as shown in FIG. 26, the bottom end of the housing 238 is spaced from the mounting flange 248*a*, 248*b* to form a space 388. Thereafter, the conductive component 26 is inserted through the mating end 352 of the housing 238, and into the receiving space 290 to engage with the contact beams 270*a*, 270*b* on each side 30, 32 thereof to form an electrical connection therebetween.

The electrical system defines first and second deflection zones Z1 and Z2, see FIG. 26. The first deflection zone Z1 extends between the clamp 40 and the front ends 275*a*, 275*b* of the spring fingers 244*a*, 244*b*. The second deflection zone Z2 extends between the front ends 275*a*, 275*b* of the spring fingers 244*a*, 244*b* and the bottom ends 252*a*, 252*b* of the clamped planar bodies 242*a*, 242*b*. When the conductive component 26 is being engaged with the contact beams 270*a*, 270*b*, the contact beams 270*a*, 270*b* deflect in the first deflection zone Z1. The contact beams 270*a*, 270*b* provide for a stable normal force on the conductive component 26. When the conductive component 26 is received within the receiving space 290 but the conductive component 26 is not directly aligned with the receiving space 290, the second deflection zone Z2 allows for a degree of misalignment between the electrical connector 222 and the conductive component 26. If misaligned, the free standing beam formed by the clamped housing 238, the planar bodies 242*a*, 242*b*, and the spring fingers 244*a*, 244*b* will deflect in a lateral direction around the longitudinal axes 262*a*, 262*b* relative to the mounting flanges 248*a*, 248*b* in the second deflection zone Z2. In this arrangement, the normal force exhibited on the conductive component 26 remains constant as the housing 238, the clamped planar bodies 242*a*, 242*b*, and the spring fingers 244*a*, 244*b* move in the lateral direction. As shown, the size of the receiving space 290 remains constant during the lateral deflection of the housing 238, the clamped electrical contacts 236*a*, 236*b* and the spring fingers 244*a*, 244, and thus the force will remain the same.

A pair of clamped electrical contacts 236*a*, 236*b* are shown, but multiple pairs of clamped electrical contacts 236*a*, 236*b* are contemplated.

Attention is invited to the embodiment of the electrical connector 422 shown in FIGS. 27-32. The electrical connector 422 and the electrical element 24 are oriented with respect to mutually aligned axes that include a longitudinal axis, an elevation (or vertical) axis, and a lateral (or horizontal) axis. This arrangement is typically called a "vertical" system mounting portion.

Each electrical contact 436*a*, 436*b* has a connecting portion having a substantially rectangular-shaped planar body 442*a*, 442*b* and spring fingers 444*a*, 444*b* extending from the planar body 442*a*, 442*b*, and further has a mounting portion 446*a*, 446*b* extending from the planar body 442*a*, 442*b*, and a mounting flange 448*a*, 448*b* extending from the planar body 442*a*, 442*b*. The planar bodies 442*a*, 442*b* and the spring fingers 444*a*, 444*b*, when clamped together by the clamp 40 as described herein, form a free standing beam within the housing 438. The electrical contacts 436*a*, 436*b* are identically formed to the electrical contacts 236*a*, 236*b* with the exception of the following differences. The mounting portions 446*a*, 446*b* are coplanar with the respective planar bodies 442*a*, 442*b*, instead of being perpendicular thereto, and the mounting portions 446*a*, 446*b* do not include openings. In addition, a tab 521*a*, 521*b* extends outward from a side edge of each mounting flange 448*a*, 448*b* and is proximate to a lower end of the mounting portion 446*a*, 446*b*. Therefore, the specifics of the electrical contact 436*a*, 436*b* are not repeated herein and like components are denoted with like reference numerals, but with this embodiment being the in four hundreds.

The electrical contacts 436*a*, 436*b* are clamped together by the clamp 40 (anyone of the clamps 40 shown in FIGS. 6-15, or any other suitable clamp, may be used) to form a clamped pair prior to insertion into the housing 438 in the same manner as electrical contacts 236*a*, 236*b*, except that the mounting flanges 448*a*, 448*b* are parallel to each other. The planar bodies 442*a*, 442*b* are coupled together by the clamp 40 to prevent relative movement between the planar bodies 442*a*, 442*b*. As illustrated, the clamp 40 is located about midway along the length of a beam formed by the planar bodies 442*a*, 442*b* and the spring fingers 444*a*, 444*b*.

The housing 438 has a side wall 542, an opposite side wall 544, and side walls 546, 548 extending therebetween, which defines a cavity 550 that extends from a mating or top end 552 of the housing 438 to a mounting or bottom end 554 of the housing 438. A longitudinal axis extends along the housing 438 from the mating end 552 to the mounting end 554. The front and rear ends of the cavity 550 are open to define a top opening 558 and a bottom opening 560. Each side wall 542, 544 has an elongated slot 556 which extends from the mating end 552 toward the mounting end 554 and which is in communication with the cavity 550 and the top opening 558. In the illustrated embodiment, the top opening 558 and the slots 556 have dimensions which accommodate receipt of the conductive component 26 therein when the mating edge 54 of the conductive component 26 is advanced into the top opening 558 and the slots 556 along a mating direction. The mating direction extends substantially parallel to the longitudinal axis of the housing 438.

Like housing 238, the housing 438 includes an engagement (not shown), like projections 362, which engages with the projections 484*a*, 484*b* of the clamped pair of electrical contacts 436*a*, 436*b*. This coupling of the engagements prevents the mounting portions 446*a*, 446*b* from moving relative to the housing 438. Like housing 238, the housing 438 includes a plurality of surfaces in the side wall 542 forming an elongated recess 582 extending longitudinally from the mounting end 554 toward the mating end 552, and a plurality of surfaces in the side wall 544 forming an elongated recess 584 extending longitudinally from the mounting end 554 toward the mating end 552. The tabs 464*a*, 464*b*, 521*a*, 521*b* are received in the recess 582, and the tabs 466*a*, 466*b*, 523*a*, 523*b* are received in the recess 584. The recess 582 has a width which is slightly wider than the combined widths of the tabs 464*a*, 464*b*, and the recess 584 has a width which is slightly wider than the combined widths of the tabs 466*a*, 466*b*.

The housing 438 further includes a first mounting wing 525 extending outward from the side wall 546 and perpendicular to the longitudinal axis of the housing 438, and a second mounting wing 527 extending outward from the side wall 548 and perpendicular to the longitudinal axis of the housing 438. The mounting wings 525, 527 are horizontally aligned with each other.

The clamped electrical contacts 436*a*, 436*b* are inserted into the housing 438 by first inserting the spring fingers 444*a*, 444*b* through the mounting end 554 of the housing 438. Outer surfaces of the projections 484*a* and the second sections 480*a* slide along an inner surface of the side wall 546, outer surfaces of the projections 484*b* and the second sections 480*b* slide along an inner surface of the side wall 548, the tabs 464*a*, 464*b*, 521*a*, 521*b* slide along the recess 582, and the tabs 466*a*, 466*b*, 523*a*, 523*b* slide along the recess 584. The hook-shaped ends of the projections 484*a*, 484*b* on the electrical contacts 436*a*, 436*b* engage with the projections (not shown) on the housing 438 and the clamped electrical contacts 436*a*, 436*b* are thus prevented from being easily removed from the housing 438. With the clamped electrical contacts 436*a*, 436*b* positioned within the housing 438, the mounting portions 446*a*, 446*b* are rigidly affixed to the housing 438. The clamped electrical contacts 436*a*, 436*b* inversely face each other.

To form the electrical system 420, the electrical connector 422 is electrically coupled to the electrical element 24 by securing the mounting wings 525, 527 to the electrical element 24, for example by screws extending through openings of the mounting wings 525, 527 and into the electrical element 24. The housing 438 passes through an opening (not shown) in the electrical element 24. The electrical system 20 defines first and second deflection zones Z1 and Z2, see FIG. 32. The first deflection zone Z1 extends between the clamp 40 and the front ends 475*a*, 475*b* of the spring fingers 444*a*, 444*b*. The second deflection zone Z2 extends between the front ends 475*a*, 475*b* of the spring fingers 444*a*, 444*b* and the bottom ends 452*a*, 452*b* of the clamped planar bodies 442*a*, 442*b*. Thereafter, the conductive component 26 (or housing 438 and mounting flanges 448*a*, 448*b* of another electrical connector 422) is inserted through the mating end 552 of the housing 438, and into the receiving space 490 to engage with the contact beams 470*a*, 470*b* on each side 30, 32 thereof to form an electrical connection therebetween. When the conductive component 26 (or the mounting flanges 448*a*, 448*b*) is being engaged with the contact beams 470*a*, 470*b*, the contact beams 470*a*, 470*b* deflect in the first deflection zone Z1. The contact beams 470*a*, 470*b* provide for a stable normal force on the conductive component 26. When the conductive component 26 (or the mounting flanges 448*a*, 448*b* of another electrical connector 422) is received within the receiving space 490 but the conductive component 26 (or the mounting flanges 448*a*, 448*b* of another electrical connector 422) is not directly aligned with the receiving space 490, the second deflection zone Z2 allows for a degree of misalignment between the electrical connector 422 and the conductive component 26 (or the mounting flanges 448*a*, 448*b* of another electrical connector 422). If misaligned, the free standing beam formed by the planar bodies 442*a*, 442*b* and the spring fingers 444*a*, 444*b* will deflect in a lateral direction around the longitudinal axes 462*a*, 462*b* relative to the mounting flanges 448*a*, 448*b* and the housing 438 in the second deflection zone Z2. In this arrangement, the normal force exhibited on the conductive component 26 (or the mounting flanges 448*a*, 448*b* of another electrical connector 422) remains constant as the clamped planar bodies 442*a*, 442*b* and the spring fingers 444*a*, 444*b* move in the lateral direction relative to mounting flanges 448*a*, 448*b* and the housing 438. As shown, the size of the receiving space 490 remains constant during the lateral deflection of the clamped electrical contacts 436*a*, 436*b* and the spring fingers 444*a*, 444, and thus the force will remain the same.

The widths of the recesses 582, 584 limit the amount of movement of the planar bodies 442*a*, 442*b* and the spring fingers 444*a*, 444*b* in the second deflection zone Z2 since the tabs 464*a*, 464*b*, 466*a*, 466*b* seat within the recesses 582, 584.

The widths of the recesses 582, 584 limit the amount of movement of the planar bodies 442*a*, 442*b* and the spring fingers 444*a*, 444*b* in the second deflection zone Z2 since the tabs 464*a*, 464*b*, 466*a*, 466*b* seat within the recesses 582, 584.

A pair of clamped electrical contacts 436*a*, 436*b* are shown, but multiple pairs of clamped electrical contacts 436*a*, 436*b* are contemplated.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. An electrical connector comprising:

an insulative housing having a first end and a second end, and a cavity extending from the first end to the second end;

a first electrical contact including a first planar body having a first end and an opposite second end, wherein a first longitudinal axis is defined between the first and second ends of the first planar body, first spring fingers extending from the first end of the first planar body, the first spring fingers being proximate to the first end of the first planar body, and a first mounting portion extending from the first planar body, the first mounting portion including a first section extending from the first planar body and which is perpendicular to the first planar body and a second section extending from the first section and which is perpendicular to the first section, the second section being fixed to the housing, the first planar body, the first spring fingers and the first mounting portion being positioned within the cavity of the housing;

a second electrical contact including a second planar body having a first end and an opposite second end, wherein a second longitudinal axis is defined between the first and second ends of the second planar body, second spring fingers extending from the first end of the second planar body, the second spring fingers being proximate to the first end of the second planar body, and a second mounting portion extending from the second planar body, the second mounting portion including a first section extending from the second planar body and which is perpendicular to the second planar body and a second section extending from the first section of the second mounting portion and which is perpendicular to the first section of the second mounting portion, the second section of the second mounting portion being fixed to the housing, the second planar body, the second spring fingers and the second mounting portion being positioned within the cavity of the housing; and a clamp coupling the first and second planar bodies together, the first and second spring fingers define a receiving space therebetween which is configured to receive a conductive component, wherein a first deflection zone is defined between the clamp and first ends of the first and second spring fingers, wherein, in the first deflection zone, the first and second spring fingers are configured to deflect in a lateral direction within the cavity relative to the respective first and second longitudinal axes to receive the conductive component within the receiving space, wherein a second deflection zone is defined between the first ends of the first and second spring fingers and the second ends of the first and second planar bodies, and wherein, in the second deflection zone, the first and second planar bodies and the first and second spring fingers are configured to deflect in the lateral direction within the cavity when the conductive component is received within the receiving space but the conductive component is not directly aligned with the receiving space.

2. The electrical connector as defined in claim 1, wherein the clamp couples the first and second planar bodies together proximate to the first and second spring fingers.

3. The electrical connector of claim 1, wherein the clamp is a rivet or a screw that extends through the planar bodies.

4. The electrical connector of claim 1, wherein the clamp is a projection extending from one of the planar bodies which seats within an opening in the other of the planar bodies.

5. The electrical connector of claim 1, wherein the clamp is a C-shaped clip that extends openings in the planar bodies.

6. The electrical connector of claim 1, wherein the clamp is a clip having a body extending through apertures in the planar bodies, heads formed on each end of the body of the clip, and a collar portion extending from the body of the clip, the collar portion being positioned between the planar bodies.

7. The electrical connector of claim 6, wherein the clip is conductive.

8. The electrical connector of claim 1, wherein the first electrical contact further comprises a first mounting flange extending from the first planar body, the second electrical contact further comprises a second mounting flange extending from the second planar body, the first and second mounting flanges being configured to be coupled to an electrical element.

9. The electrical connector of claim 1, wherein each electrical contact further comprises a mounting flange extending from the second section of the mounting portion, the mounting flange being configured to be coupled to an electrical element.

10. The electrical connector of claim 1, wherein the housing further comprises a pair of mounting flanges, the mounting flanges being configured to be coupled to an electrical element.

11. The electrical connector as defined in claim 1, in combination with a circuit board.

12. The combination of claim 11, wherein in each electrical contact, the first section of the mounting portion extends from the second end of the planar body.

13. The combination of claim 11, wherein the clamp is comprised of one of a rivet, a screw and a clip.

14. The electrical connector as defined in claim 1, wherein each first section is U-shaped.

15. An electrical connector comprising:

an insulative housing having a first end and a second end, and a cavity extending from the first end to the second end, the cavity being formed by walls;

a first electrical contact including a first connecting portion and a first mounting portion, the first connecting portion having a first planar body and first spring fingers, the first planar body having a first end and an opposite second end and a first longitudinal axis is defined therebetween, the first spring fingers extending from the first end of the first planar body, the first mounting portion extending from the first planar body and being rigidly affixed to the housing within the cavity, the first mounting portion causing the first connecting portion to be positioned within the cavity of the housing and spaced from the walls of the cavity;

a second electrical contact including a second connecting portion and a second mounting portion, the second connecting portion having a second planar body and second spring fingers, the second planar body having a first end and an opposite second end and a second longitudinal axis is defined therebetween, the second spring fingers extending from the first end of the second planar body, the second mounting portion extending from to the second planar body and being rigidly affixed to the housing, the second mounting portion causing the second connecting portion to be positioned within the cavity of the housing and spaced from the walls of the cavity; and a clamp between the first and second planar bodies, the clamp affixing the first and second planar bodies together, the clamp being spaced from the mounting portions, the first and second spring fingers defining a receiving space therebetween which is configured to receive a conductive component, wherein the affixed together first and second connecting portions are free-standing within the cavity and are configured to deflect in a lateral direction within the cavity relative to the respective first and second longitudinal axes to receive the conductive component within the receiving space.

16. The electrical connector as defined in claim 15, wherein a first deflection zone is defined between the clamp and first ends of the first and second spring fingers, and a second deflection zone is defined between the first ends of the first and second spring fingers and the second ends of the first and second planar bodies, wherein, in the first deflection zone, the first and second spring fingers are configured to deflect within the cavity to receive the conductive component within the receiving space, wherein in the second deflection zone, the first and second planar bodies and the first and second spring fingers are configured to deflect within the cavity when the conductive component is received within the receiving space but the conductive component is not directly aligned with the receiving space.

17. The electrical connector as defined in claim 16, wherein each first and second mounting portion has a planar section which is apart from the respective first and second planar bodies.

* * * * *